(12) United States Patent
Ohishi et al.

(10) Patent No.: US 9,490,916 B2
(45) Date of Patent: Nov. 8, 2016

(54) COMMUNICATION APPARATUS

(71) Applicant: Kabushiki Kaisha Toshiba, Minato-ku, Tokyo (JP)

(72) Inventors: Takafumi Ohishi, Yokohama (JP); Kazuhiro Inoue, Inagi (JP); Kanako Nakayama, Tokyo (JP); Takuji Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 14/605,391

(22) Filed: Jan. 26, 2015

(65) Prior Publication Data
US 2016/0028493 A1    Jan. 28, 2016

(30) Foreign Application Priority Data
Jul. 23, 2014   (JP) ................ 2014-150160

(51) Int. Cl.
*H04B 13/00* (2006.01)
(52) U.S. Cl.
CPC ................... *H04B 13/005* (2013.01)
(58) Field of Classification Search
CPC ............... H04B 13/005; H04B 5/00
See application file for complete search history.

(56) References Cited

U.S. PATENT DOCUMENTS

| 6,223,018 | B1 | 4/2001 | Fukumoto et al. | |
| 2010/0003917 | A1* | 1/2010 | Hebiguchi | H04B 13/005 455/41.1 |
| 2010/0304671 | A1* | 12/2010 | Hebiguchi | H04B 13/005 455/41.1 |
| 2012/0129449 | A1* | 5/2012 | Kurata | H04B 13/005 455/41.1 |
| 2013/0149961 | A1* | 6/2013 | Mori | H04B 13/005 455/41.1 |

FOREIGN PATENT DOCUMENTS

| JP | H10-229357 A | 8/1998 |
| JP | 2001007735 A | 1/2001 |
| JP | 2005-094466 A | 4/2005 |
| JP | 2010-045570 A | 2/2010 |
| JP | 2013-034093 A | 2/2013 |

* cited by examiner

*Primary Examiner* — David Bilodeau
(74) *Attorney, Agent, or Firm* — White & Case LLP

(57) ABSTRACT

According to an embodiment, a communication apparatus includes a substrate, a first communication unit, a first signal line, a first terminal, a second signal line, a variable capacitance portion, and an inductor portion. The substrate is provided with a reference potential electrode. The first communication unit transmits and receives. One end of the first signal line is connected to the first communication unit. The first terminal is connected to the other end of the first signal line. The second signal line is connected to the first signal line through the first terminal. One end of the variable capacitance portion is connected to the other end of the second signal line. One end of the inductor portion is connected to the other end of the variable capacitance portion. The communication apparatus executes communication through a living body.

16 Claims, 22 Drawing Sheets

COMMUNICATION APPARATUS

CROSS REFERENCE TO RELATED APPLICATION

This application is based upon and claims the benefit of priority from the prior Japanese Patent Application No. 2014-150160, filed on Jul. 23, 2014, the entire contents of which are incorporated herein by reference.

FIELD

Embodiments described herein relate to a communication apparatus.

BACKGROUND

Human body communication that transmits and receives communication data through a living body such as a human body has attracted attentions. The human body communication is expected to be applied in medical/health care, near field communication, in-vehicle wireless communication, entertainment, and the like, and can considerably reduce the power consumption compared with conventional ones.

In human body communication, a communication apparatus using a living body as a part of the transmission path are provided with two electrodes. One of the electrodes is a signal electrode connected to a signal line, and the other is a reference potential electrode connected to the ground potential of the communication apparatus having a reference potential. The signal electrodes are connected to each other mainly through a living body, and the reference potential electrodes are connected to each other mainly via space or ground. The communication apparatus thereby transmit the potential difference between the signal electrode and the reference potential electrode.

When the communication apparatus performing human body communication are reduced in size or thickness, the distance between the signal electrode and the reference potential electrode is reduced, and the capacitance of the signal electrode is increased. This can produce a reflection loss and thereby reduce the efficiency.

DETAILED DESCRIPTION

Figure 1:
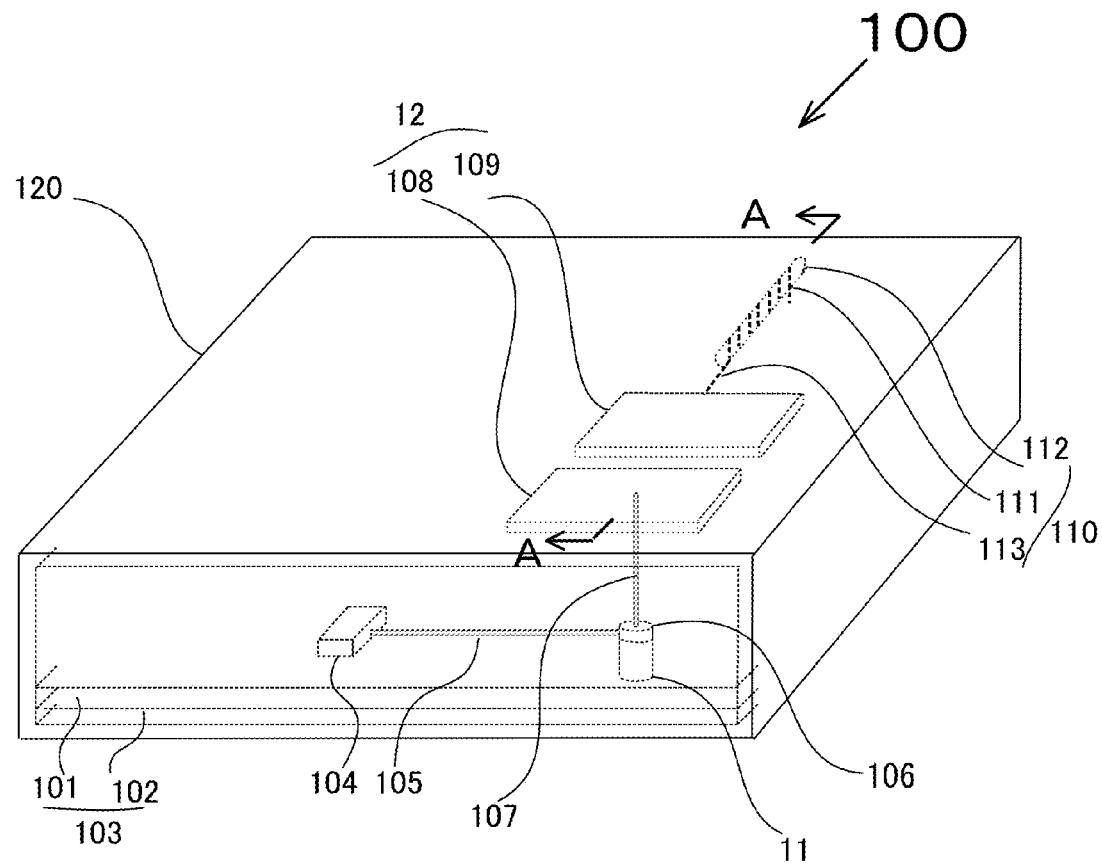
FIG. 1 is a view illustrating the configuration of a communication apparatus according to a first embodiment.

According to an embodiment, a communication apparatus includes a substrate, a first communication unit, a first signal line, a first terminal, a second signal line, a variable capacitance portion, and an inductor portion. The substrate is provided with a reference potential electrode. The first communication unit is provided on a first principal surface of the substrate and is configured to transmit and receive. The first signal line is provided on the first principal surface, and one end of the first signal line is connected to the first communication unit. The first terminal is provided on the first principal surface and is connected to the other end of the first signal line. The second signal line is connected to the first signal line through the first terminal. One end of the variable capacitance portion is connected to the other end of the second signal line. One end of the inductor portion is connected to the other end of the variable capacitance portion. The communication apparatus executes communication through a living body.

Hereinafter, embodiments will be described with reference to the drawings. In the drawings, same reference numerals indicate same or similar portions.

Figure 2:
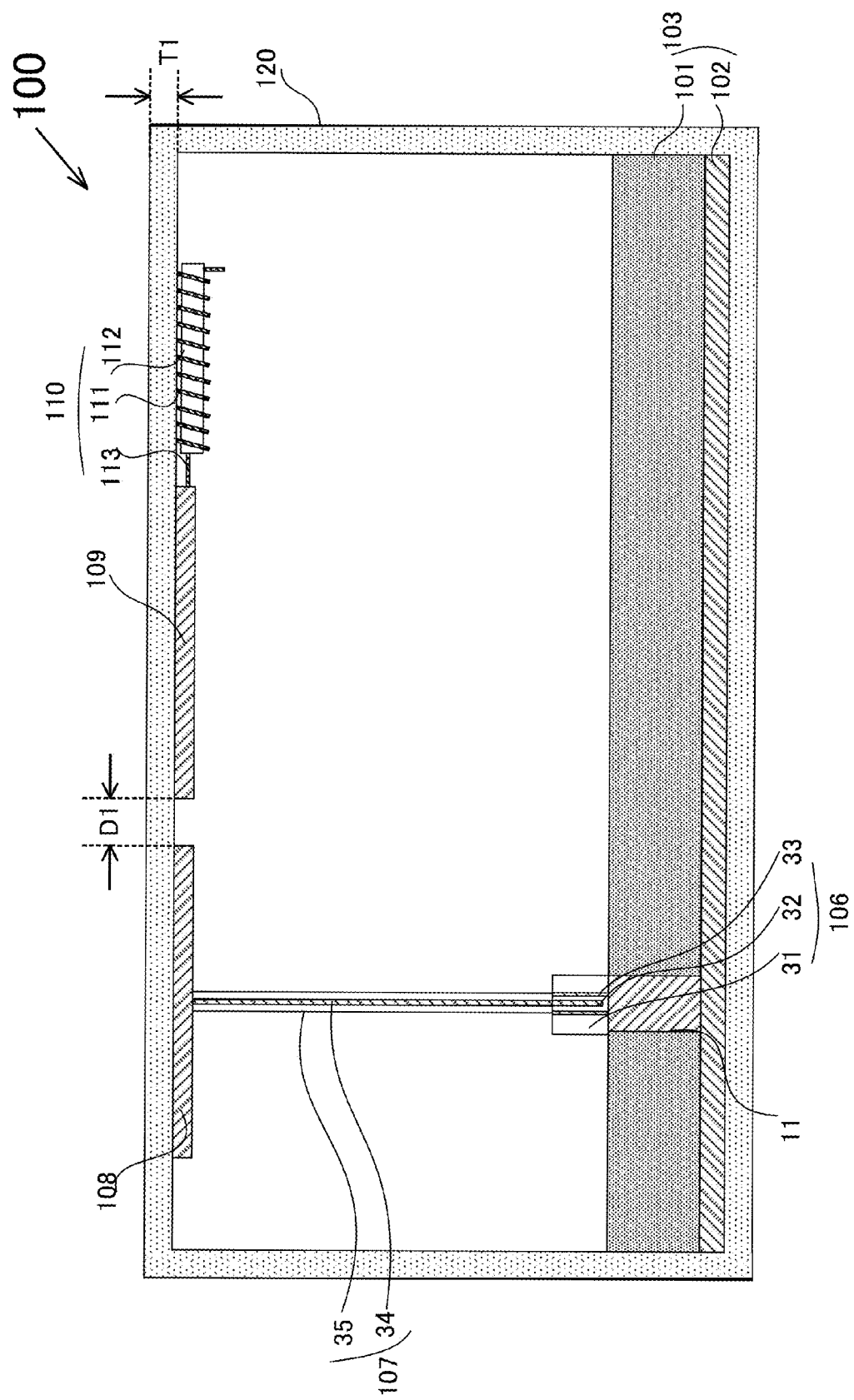
FIG. 2 is a cross-sectional view of the communication apparatus taken along a line A-A of FIG. 1.

A communication apparatus according to a first embodiment will be described with reference to the drawings. FIG. 1 is a view illustrating the configuration of the communication apparatus. FIG. 2 is a cross-sectional view of the communication apparatus taken along a line A-A of FIG. 1. In the first embodiment, the efficiency of the communication apparatus is increased by providing a variable capacitance portion and an inductor portion.

As illustrated in FIG. 1, a communication apparatus 100 includes a via 11, a variable capacitance portion 12, a substrate 103, a communication unit 104, a signal line 105, a terminal 106, a signal line 107, and an inductor portion 110, and a housing 120.

The communication apparatus 100 executes communication when a human body as the living body is close to or in contact with conductors 108, 109 of the variable capacitance portion 12. The details will be described later. The communication apparatus 100 is applied to medical/health care, near field communication, in-vehicle wireless communication, entertainment, and the like.

The housing 120 has a box shape that is larger in the horizontal direction than in the vertical direction. The housing 120 accommodates inside the via 11, the variable capacitance portion 12, the substrate 103, the communication unit 104, the signal line 105, the terminal 106, the signal line 107, and the inductor portion 110 so that the above components are not exposed to the outside.

The housing 120 has a box shape in the embodiment but may have a box shape with the edges rounded or an ellipsoidal shape instead.

The substrate 103 is composed of a dielectric portion 101 and a reference potential electrode 102. The reference potential electrode 102 is also referred to as a ground electrode. The dielectric portion 101 is provided on a first principal surface (a front surface) of the reference potential electrode 102. The dielectric portion 101 is made of an insulating ceramic or an insulating organic substance, for example. The reference potential electrode 102 is composed of a metallic layer of copper (Cu) or gold (Au), for example.

The communication unit 104 is provided on a first principal surface (the front surface) of the dielectric portion 101 of the substrate 103 and executes transmission and reception. The details will be described later. The signal line 105 (the first signal line) is provided on the first principal surface (the front surface) of the dielectric portion 101 of the substrate 103, and one end of the signal line 105 is connected to the communication unit 104. The terminal 106 (the first terminal) is provided on the first principal surface (the front surface) of the dielectric portion 101 of the substrate 103 and is connected to the other end of the signal line 105. The signal line 107 (the second signal line) is provided to the first principal surface's side of the dielectric portion 101 of the substrate 103, and one end of the signal line 107 is connected to the terminal 106. The signal line 107 is connected to the signal line 105 through the terminal 106.

The variable capacitance portion 12 is provided to the first principal surface's side of the dielectric portion 101 of the substrate 103 and includes the conductors 108, 109. The conductor 108 is connected to the other end of the signal line 107 and is connected to the terminal 106 via the signal line 107. The conductor 109 is placed alongside the conductor 108 so as to be spaced from the conductor 108.

Each conductor 108, 109 has a plate shape. The conductors 108, 109 function as a signal electrode.

The inductor portion 110 is provided to the first principal surface's side of the dielectric portion 101 of the substrate 103 and includes a winding wire 111, a core 112, and a signal line 113. The inductor portion 110 functions as the signal electrode. One end of the signal line 113 is connected to the conductor 109. The winding wire 111 is a conductor wound around the core 112 in a spiral, and one end of the winding wire 111 is connected to the conductor 109.

As illustrated in FIG. 2, the terminal 106 includes a dielectric layer 31, an inner conductor portion 32, and an outer conductor portion 33. The inner conductor portion 32 is provided at the center of the terminal 106, and the dielectric layer 31 is provided around the inner conductor portion 32. The outer conductor portion 33 is provided around the inner conductor portion 32 with the dielectric layer 31 interposed between the inner and outer conductor portions 32, 33. The dielectric layer 31 is provided around the outer conductor portion 33. The outer conductor portion 33 is connected to the reference potential electrode 102 through the via 11.

The signal line 107 includes a signal line 34 and a dielectric layer 35. The side surface of the signal line 34 is covered with the dielectric layer 35. One end of the signal line 34 is connected to the inner conductor portion 32 of the terminal 106, and the other end of the signal line 34 is connected to the conductor 108.

The conductor 108 is provided on the inner surface of the upper wall of the housing 120 having a thickness of T1. The conductor 109 is placed at a distance D1 away from the conductor 108 on the inner surface of the upper wall of the housing 120. The inductor portion 110 is provided on the inner surface of the upper wall of the housing 120.

Herein, each conductor 108, 109 is made of a transparent conductive material such as an electrode for medical use, a conductive sheet such as copper foil, conductive ink which is formed into a thin film or is sintered using application or ink jet process, or ITO (indium tin oxide). Using the conductors 108, 109 made of such a transparent conductive material is advantageous in that even when the conductors 108, 109 are laid on a display or an operating portion, users can recognize the displayed contents though the conductors 108, 109. The core 112 is made of a magnetic substance, for example. The winding wire 111 is made of copper (Cu), for example.

Figure 3:
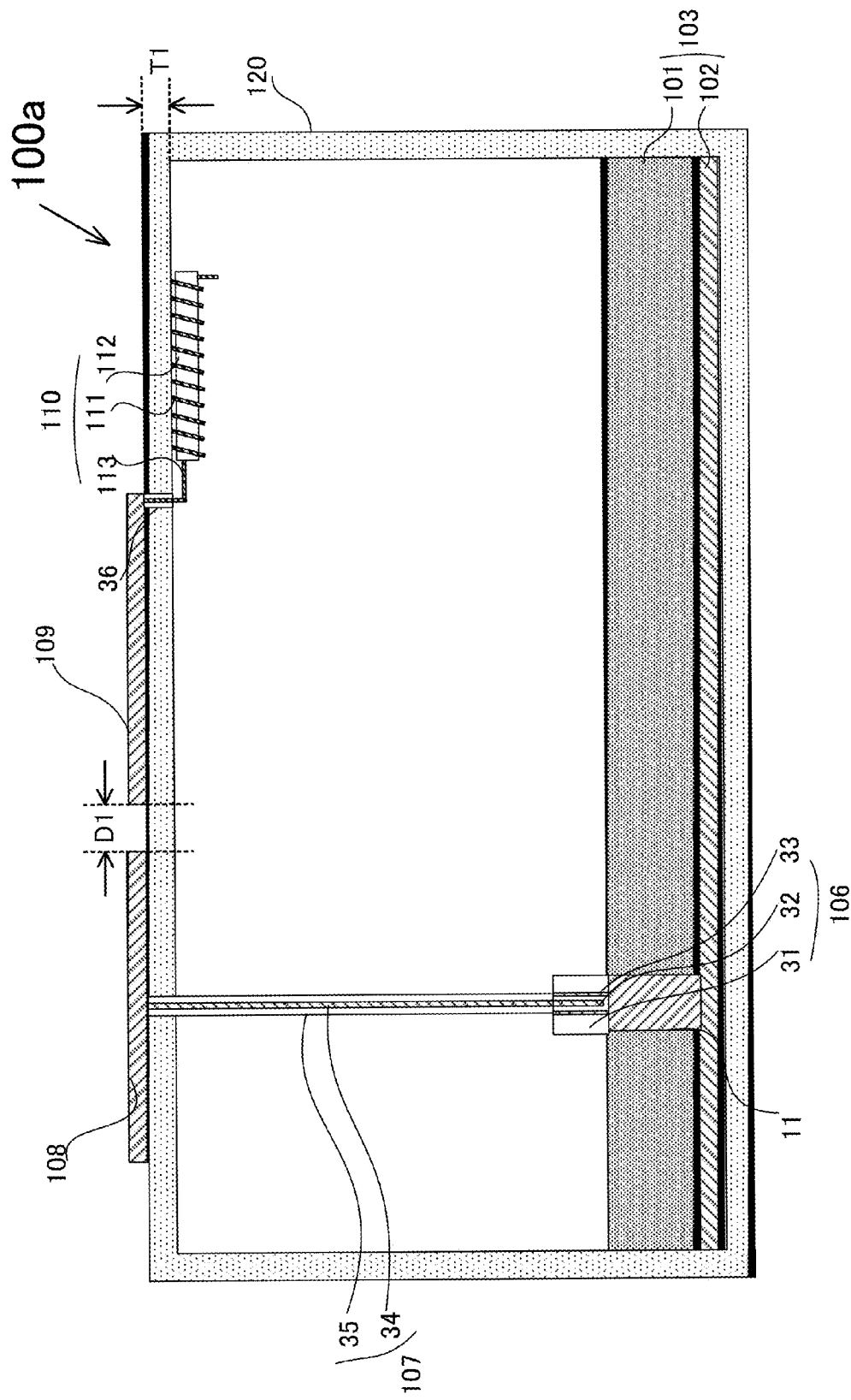
FIG. 3 is a cross-sectional view illustrating a communication apparatus of a first modification.

In the first embodiment, the conductors 108, 109 are provided on the inner surface of the housing 120 but are not necessarily limited to the above case. For example, like a communication apparatus 100a of a first modification illustrated in FIG. 3, the conductors 108, 109 may be exposed in the outer surface of the housing 120. In this case, the conductors 108, 109 are in direct contact with the chest, belly, back, waist, and hands of a human body when the communication apparatus executes communication.

Figure 4:
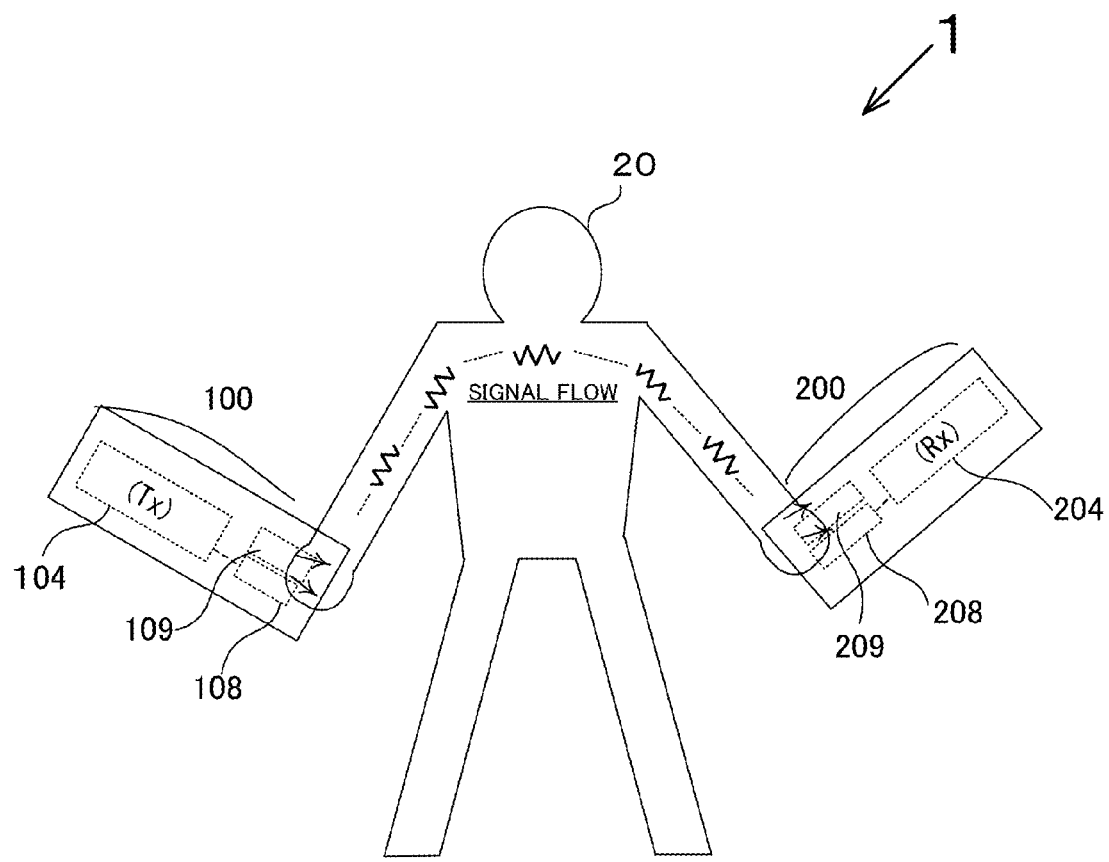
FIG. 4 is a diagram showing a communication apparatus system configuration according to the first embodiment.
Figure 5:
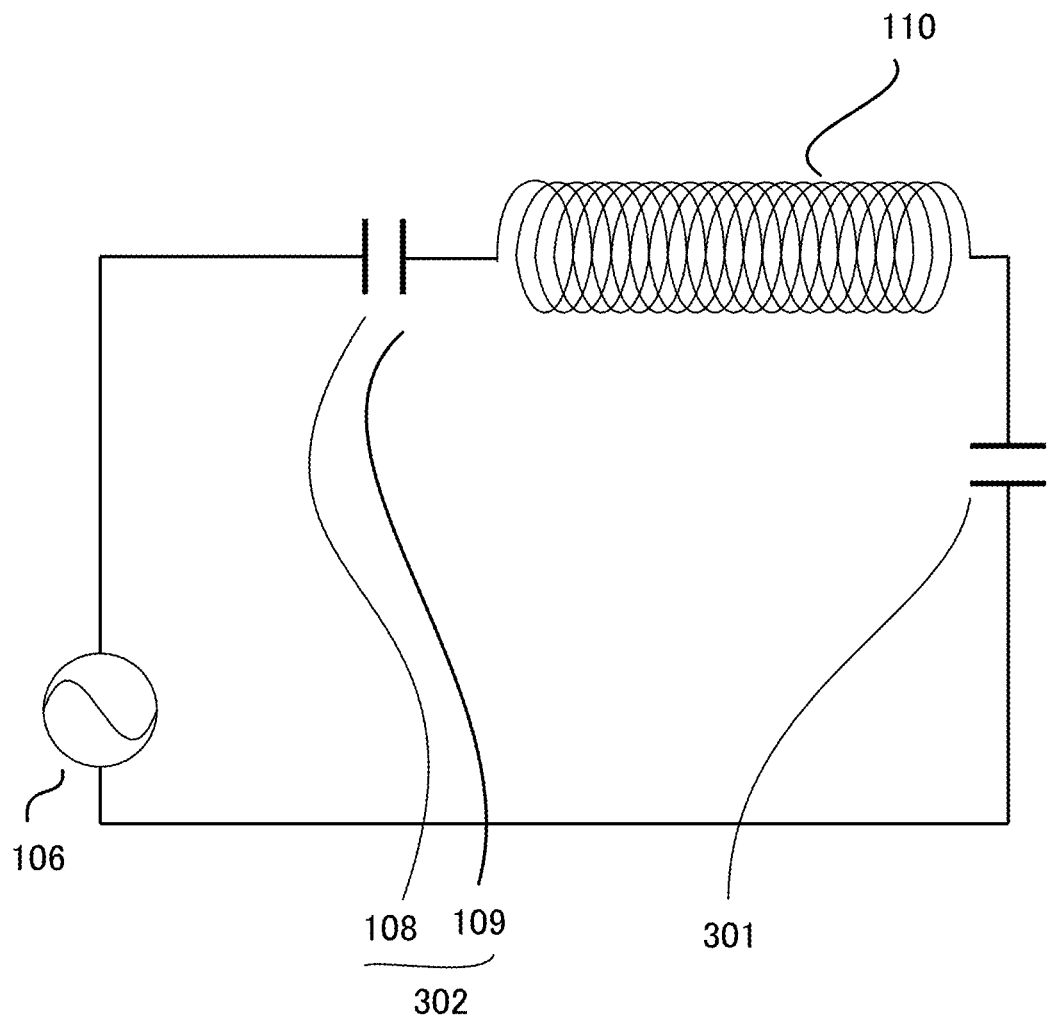
FIG. 5 is an equivalent circuit diagram of the communication apparatus according to the first embodiment.
Figure 6:
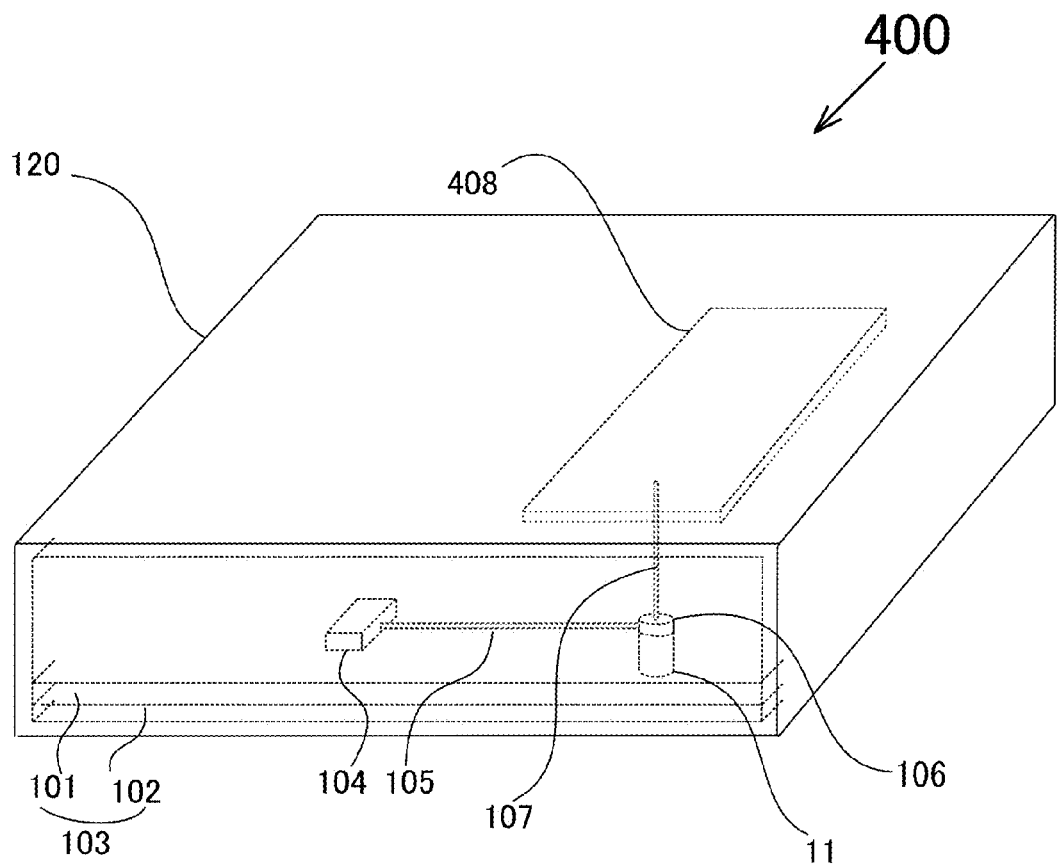
FIG. 6 is a view illustrating a communication apparatus of a comparative example.
Figure 7:
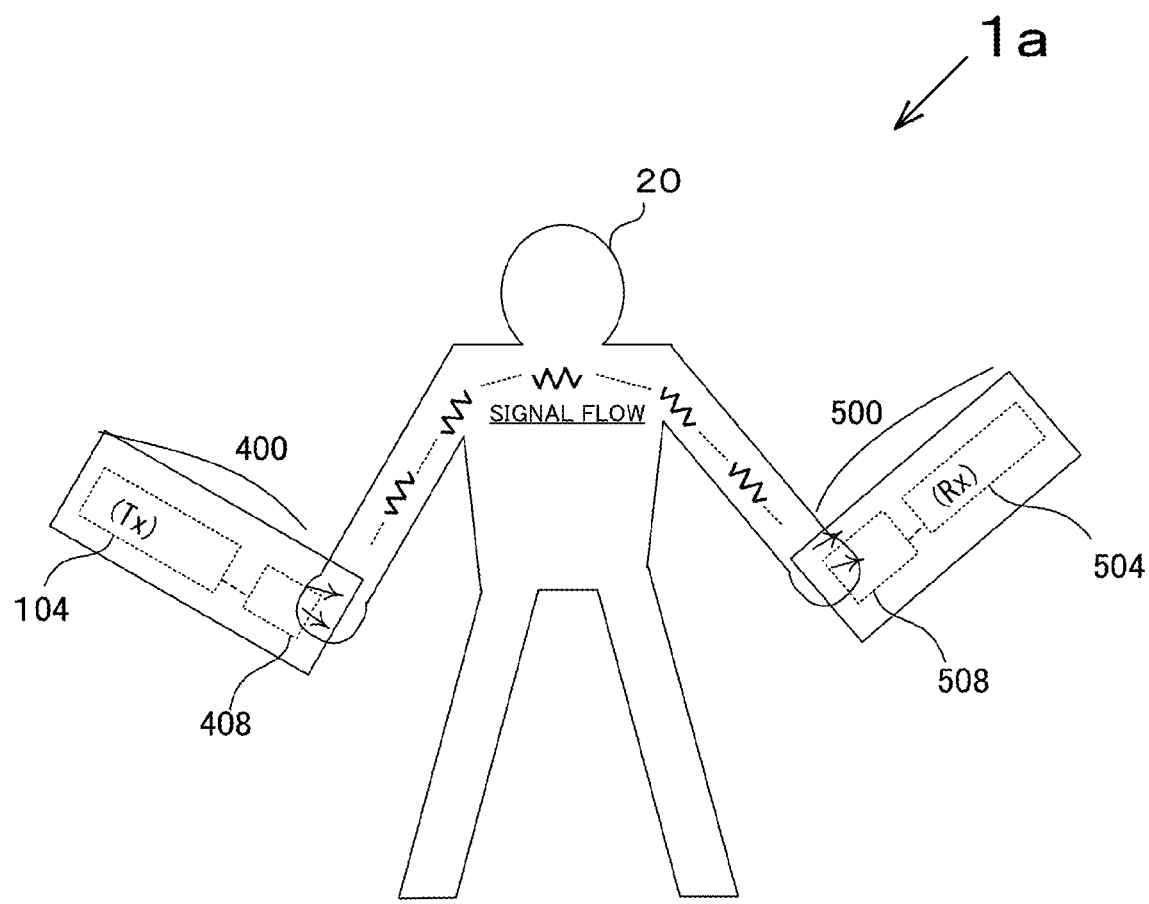
FIG. 7 is a view illustrating a communication apparatus system configuration of the comparative example.
Figure 8:
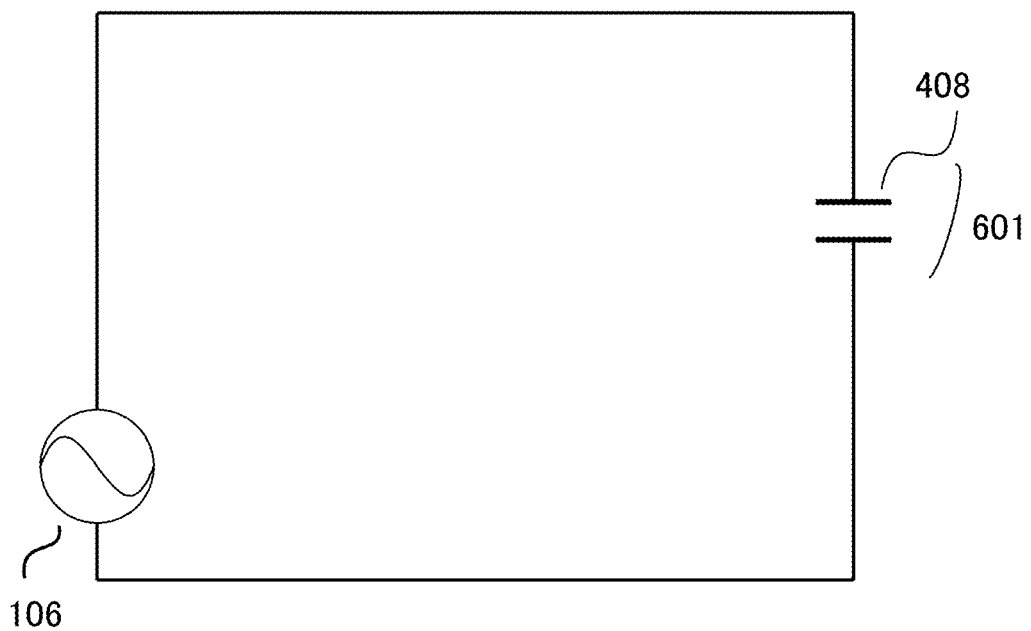
FIG. 8 is an equivalent circuit diagram of the communication apparatus of the comparative example.

Next, a communication system which executes communication between two communication apparatuses through the human body will be described with reference to FIGS. 4 to 8. FIG. 4 is a view illustrating a communication apparatus system configuration of the first embodiment. FIG. 5 is an equivalent circuit diagram of the communication apparatus of the first embodiment. FIG. 6 is a view illustrating a communication apparatus of a comparative example. FIG. 7 is a diagram illustrating a communication apparatus system configuration of the comparative example. FIG. 8 is an equivalent circuit diagram of the communication apparatus of the comparative example.

As illustrated in FIG. 4, a communication system 1 of the first embodiment executes communication through a human body 20 between the communication apparatus 100 (a first communication apparatus) and a communication apparatus 200 (a second communication apparatus).

The communication apparatus 200 includes conductors 208, 209 and a communication unit 204 and has a similar configuration as the communication apparatus 100. Accordingly, the description about the specific configurations of the communication apparatus 200, conductors 208, 209, and the communication unit 204 is omitted.

In FIG. 4, when the conductors 108, 109 of the communication apparatus 100 are close to or in contact with the left hand of the human body 20 and the conductors 208, 209 of the communication apparatus 200 is close to or in contact with the right hand of the human body 20, the communication unit 104 of the communication apparatus 100 generates a communication signal as a transmission unit (Tx). The generated communication signal is inputted to the communication apparatus 200 through the human body 20 and is received by the communication unit 204 of the communication apparatus 200 as a reception unit (Rx).

In the communication system 1, the communication units 204, 104 of the communication apparatus 200, 100 may serve as the transmission unit (Tx) and the reception unit (Rx), respectively. Herein, communication is executed when the communication apparatus 100 is close to or in contact with the right hand of the human body 20 and the communication apparatus 200 is close to or in contact with the left hand of the human body 20, but the communication system is not necessarily limited to the above case. Communication may be executed when the communication apparatuses 100 and 200 are close to or in contact with the chest, belly, back, waist, and the like of the human body 20 instead of the hands.

As illustrated in FIG. 5, in the equivalent circuit of the communication apparatus 100 of the first embodiment, the conductors 108, 109 form a capacitor 302. The capacitor 302 functions as a variable capacitance element having capacitance that changes depending on the distance between the human body 20 and the conductors 108, 109 (whether the conductors 108, 109 are close to or in contact with the human body 20). A stray capacitance 301 is a capacitance generated between the capacitor 302, inductor portion 110 and the reference potential electrode 102. The capacitance of the stray capacitance 301 changes depending on the distance between the human body 20 and the conductors 108, 109, inductor portion 110 (whether the conductors 108, 109 are close to or in contact with the human body 20). The capacitor 302, the inductor portion 110, and the stray capacitance 301 are series-connected to constitute an LC series circuit.

In the embodiment, the capacitor 302, that exists when the human body 20 is close to or in contact with the conductors 108, 109, and the inductor portion 110, which is connected to the conductor 109, constitutes an LC series circuit that reduces the stray capacitance 301. It is therefore possible to reduce reflection of communication signal inputted from the terminal 106, thereby increasing the efficiency of communication executed by the communication system 1.

As illustrated in FIG. 6, a communication apparatus 400 of a comparative example includes the via 11, the substrate 103, the communication unit 104, the signal line 105, the terminal 106, the signal line 107, and the housing 120 and further includes a conductor 408. The communication apparatus 400 of the comparative example includes the conductor 408 as the signal electrode instead of the variable capacitance portion 12 and inductor portion 110 of the communication apparatus 100 of the embodiment.

The conductor 408 is provided to the first principal surface's side of the dielectric portion 101 of the substrate 103. The conductor 408 is connected to the other end of the signal line 107 and is connected to the terminal 106 through the signal line 107.

As illustrated in FIG. 7, a communication system 1a of the comparative example executes communication through the human body 20 between the communication apparatus 400 (the first communication apparatus) and a communication apparatus 500 (the second communication apparatus).

The communication apparatus 500 includes a conductor 508 and a communication unit 504 and has the same configuration as the communication apparatus 400.

In FIG. 7, when the conductor 408 of the communication apparatus 400 is close to or in contact with the left hand of the human body 20 and the conductor 508 of the communication apparatus 500 is close to or in contact with the right hand of the human body 20, the communication unit 104 of the communication apparatus 400 generates a communication signal as a transmission unit (Tx). The generated communication signal is inputted to the communication apparatus 500 through the human body 20 and is received by the communication unit 504 of the communication apparatus 500 as a reception unit (Rx).

As illustrated in FIG. 8, in the equivalent circuit of the communication apparatus 400 of the comparative example, a stray capacitance 601 exists between the conductor 408 and the reference potential electrode 102. The value of the stray capacitance 601 is inversely proportional to the distance between the conductor 408 and the reference potential electrode 102. When the distance between the conductor 408 and the reference potential electrode 102 is short, the stray capacitance 601 has a large value. Communication signal inputted from the terminal 106 to the conductor 408 is therefore reflected, thus producing a loss.

Figure 9:
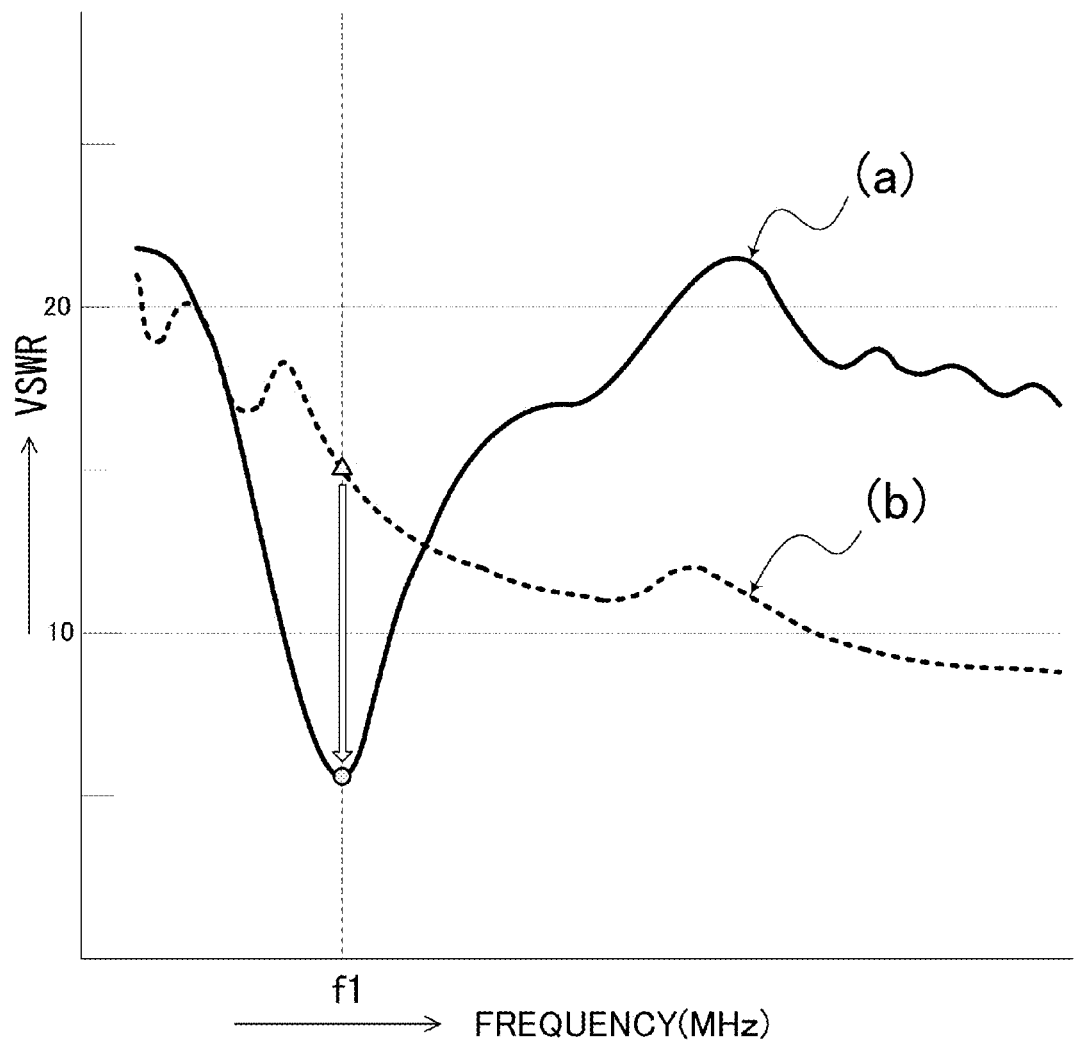
FIG. 9 is a diagram showing frequency characteristics of VSWR according to the first embodiment.
Figure 10A:
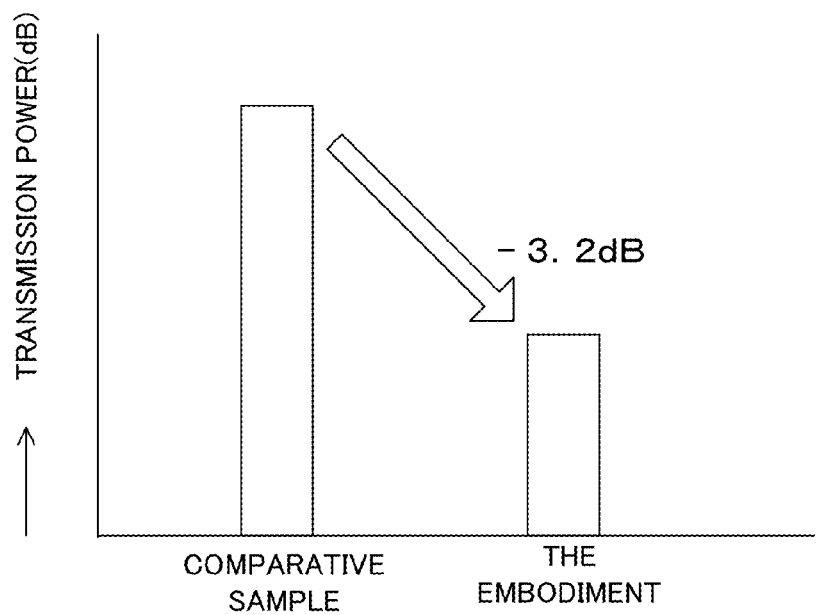
FIGS. 10A and 10B are diagrams showing comparison of electric power between the first embodiment and the comparative example, FIG. 10A being a comparison diagram of transmission power, FIG. 10B being a comparison diagram of received power.
Figure 10B:
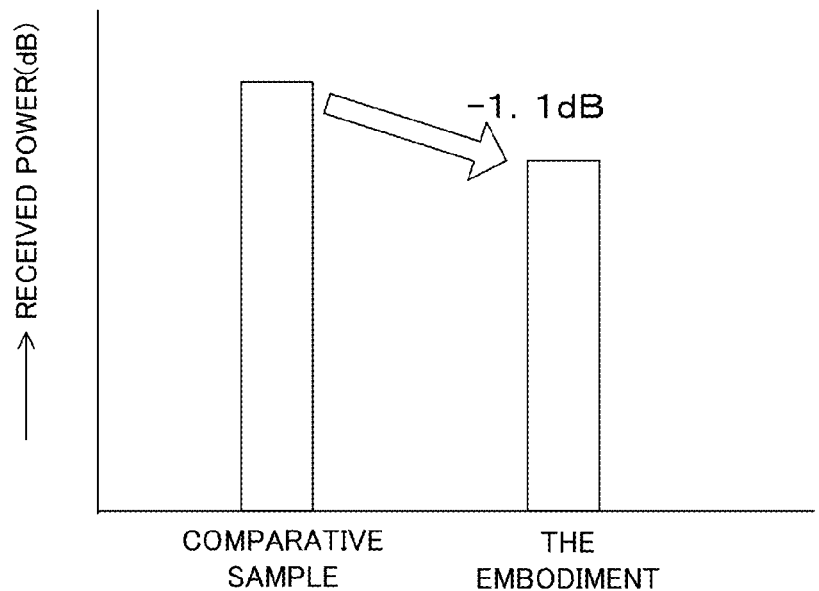

Next, the frequency characteristics of the communication apparatuses will be described with reference to FIGS. 9 and 10. FIG. 9 is a diagram showing frequency characteristics of VSWR. In FIG. 9, solid line (a) indicates the frequency characteristics of the embodiment, and dashed line (b) indicates the frequency characteristics of the comparative example. FIG. 10A is a comparison diagram of transmission power, and FIG. 10B is a comparison diagram of received power. Herein, communication frequency f1 used in human-body communication is 10 MHz.

As shown in FIG. 9, in the comparative example indicated by the dashed line (b), when communication is executed at the communication frequency f1, the VSWR (voltage standing wave ratio) is high, and the reflection loss is large.

On the other hand, because of the provision of the variable capacitance portion 12 and the inductor portion 110, the first embodiment indicated by the solid line (a) can be less capacitive than the comparative example. Accordingly, the VSWR is considerably lower than that of the comparative example (the VSWR value of the embodiment is about 10 lower than that of the comparative example at the communication frequency f1), so that the reflection loss is small. Moreover, even if the communication frequency f1 varies, the VSWR of the first embodiment is lower than that of the comparative example.

As shown in FIG. 10A, because of the provision of the variable capacitance portion 12 and the inductor portion 110 in the embodiment, the transmission power (dB) of the communication apparatus of the embodiment can be improved 3.2 dB more than that of the communication apparatus of the comparative example. As shown in FIG. 10B, because of the provision of the variable capacitance portion 12 and the inductor portion 110 in the embodiment, the reception power (dB) of the communication apparatus of the embodiment can be improved 1.1 dB more than that of the communication apparatus of the comparative example.

As described above, the communication apparatus of the first embodiment includes the via 11, the variable capacitance portion 12, the substrate 103, the communication unit 104, the signal line 105, the terminal 106, the signal line 107, the inductor portion 110, and the housing 120. The variable capacitance portion 12 includes the conductors 108, 109.

The conductor 109 is located alongside the conductor 108 so as to be spaced from the conductor 108. The inductor portion 110 includes the winding wire 111, the core 112, and the signal line 113. When the human body 20 is close to or in contact with the communication apparatus 100, communication is executed, and the capacitor 302, which is composed of the conductors 108, 109, and the inductor portion 110 constitute an LC series circuit that reduces the stray capacitance 301.

Accordingly, when the human body 20 is close to or in contact with the communication apparatus 100, the communication apparatus 100 can execute communication with high efficiency.

In the first embodiment, the communication frequency f1 is set to 10 MHz for medical applications, for example but is not necessarily limited to the above case. The communication frequency f1 may be set to 21 MHz, 32 MHz, or a range from 5 to 9 MHz, for example.

The inductor portion 110 can be replaced with a variable inductor so that the VSWR is reduced to increase the efficiency even if the communication frequency f1 varies. Use of a variable inductor enables automatic impedance matching.

In the embodiment, communication is executed through the human body 20 but is not necessarily limited to the above case. For example, communication may be executed through a living body of a dog, a cat, or the like.

In the embodiment, the variable capacitance portion 12 and the inductor portion 110 are provided on the first principal surface of the substrate 103, but are not limited to the above case. The variable capacitance portion 12 and the inductor portion 110 may be located on a second principal surface of the substrate 103, which is opposite to the first principal surface, on the side surface of the housing 120, or the like, for example. The thus-configured communication apparatus can execute communication with high efficiency in a similar manner to the first embodiment.

Figure 11:
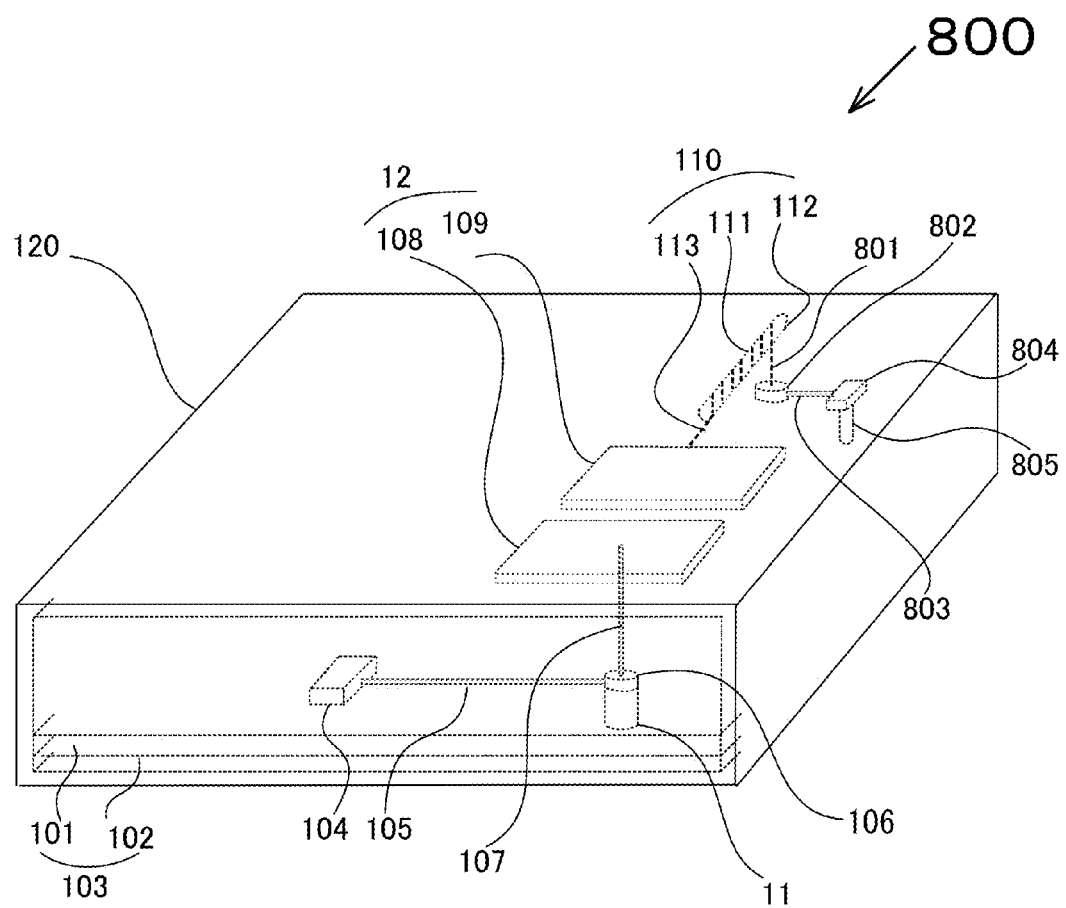
FIG. 11 is a view illustrating the configuration of a communication apparatus according to a second embodiment.
Figure 12:
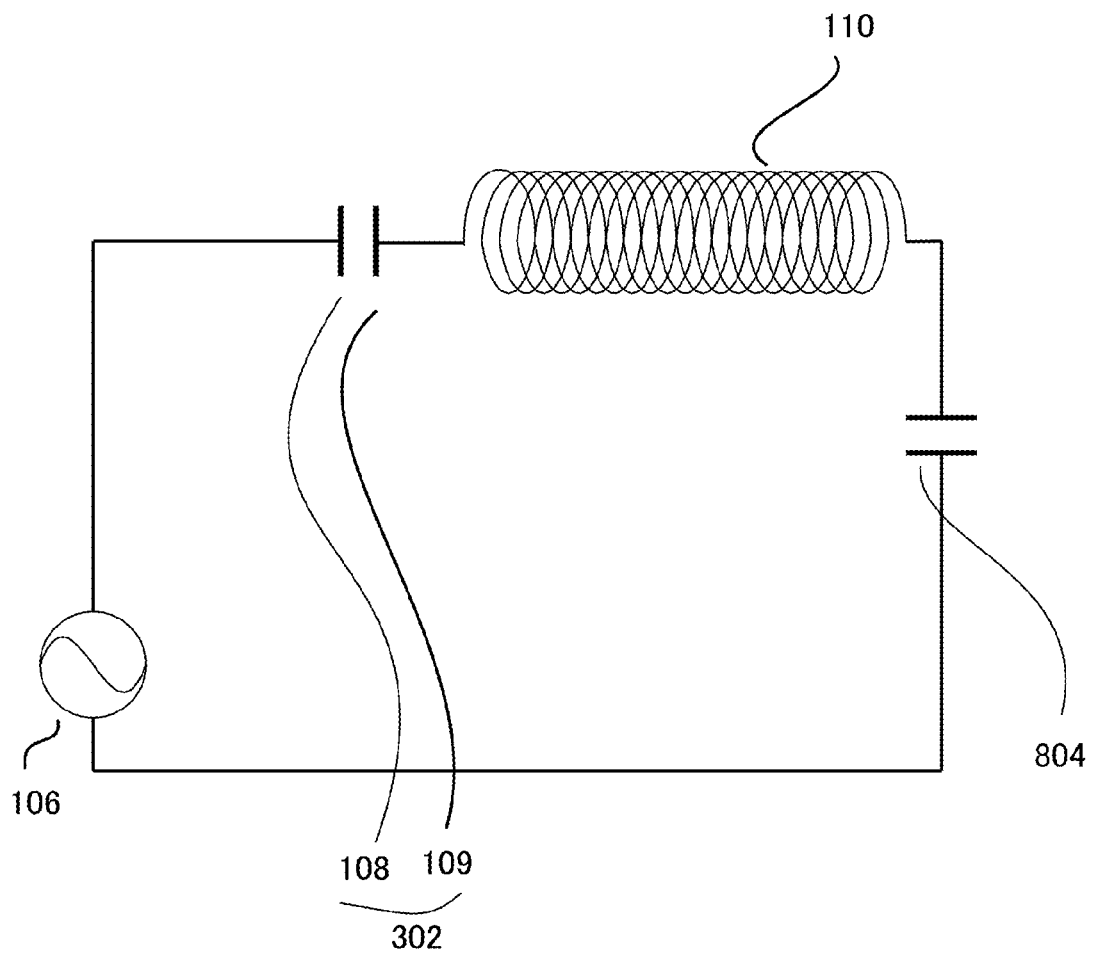
FIG. 12 is an equivalent circuit diagram of the communication apparatus according to the second embodiment.

A communication apparatus according to a second embodiment will be described with reference to the drawings. FIG. 11 is a diagram illustrating the configuration of the communication apparatus of the second embodiment. FIG. 12 is an equivalent circuit diagram of the communication apparatus of the second embodiment. In the second embodiment, the capacitance of the signal electrode is reduced when communication is in execution by providing a capacitor between the inductor portion and the reference potential electrode.

Hereinafter, the same constituent portions as those of the first embodiment are given the same reference numerals and are not described, and only different portions will be described.

As illustrated in FIG. 11, a communication apparatus 800 includes the via 11, the variable capacitance portion 12, the substrate 103, the communication unit 104, the signal line 105, the terminal 106, the signal line 107, the inductor portion 110, the housing 120 and further includes a signal line 801, a terminal 802, a signal line 803, a capacitor 804, and a via 805.

The communication apparatus 800 executes communication when the human body 20 is close to or in contact with the conductors 108, 109 of the variable capacitance portion 12. The communication apparatus 800 is applicable to medical/health care, near field communication, in-vehicle wireless communication, entertainment, and the like.

The signal line 801 is provided on the first principal surface's side of the dielectric portion 101 of the substrate 103, and one end of the signal line 801 is connected to the other end of the winding wire 111 of the inductor portion 110. The terminal 802 is provided on the first principal surface (the front surface) of the dielectric portion 101 of the substrate 103 and is connected to the other end of the signal line 801. The terminal 802 has a similar structure to the terminal 106. The signal line 803 is provided on the first principal surface (the front surface) of the dielectric portion 101 of the substrate 103, and one end of the signal line 803 is connected to the terminal 802.

The capacitor 804 is provided on the first principal surface (the front surface) of the dielectric portion 101 of the substrate 103. One end of the capacitor 804 is connected to the other end of the signal line 803, and the other end of the capacitor 804 is connected to the reference potential electrode 102 through the via 805.

As illustrated in FIG. 12, in the equivalent circuit of the communication apparatus 800 of the second embodiment, the capacitor 302, the inductor portion 110, and the capacitor 804 are series-connected to constitute an LC series circuit. Herein, the stray capacitance 301 existing in the first embodiment does not exist.

The thus-configured LC series circuit can reduce the capacitance of the signal electrode at a desired communication frequency through the capacitor 804 even if the inductor portion 110 does not have a desired inductance value because of the necessary mounting area. The efficiency of the communication apparatus 800 can be increased.

As described above, the communication apparatus of the second embodiment includes the via 11, the variable capacitance portion 12, the substrate 103, the communication unit 104, the signal line 105, the terminal 106, the signal line 107, the inductor portion 110, the housing 120, the signal line 801, the terminal 802, the signal line 803, the capacitor 804, and the via 805. The capacitor 804 reduces the capacitance of the signal electrode when execution is in execution.

Accordingly, when being close to or in contact with the human body 20, the communication apparatus executes communication with high efficiency in a similar manner to the first embodiment.

Figure 13:
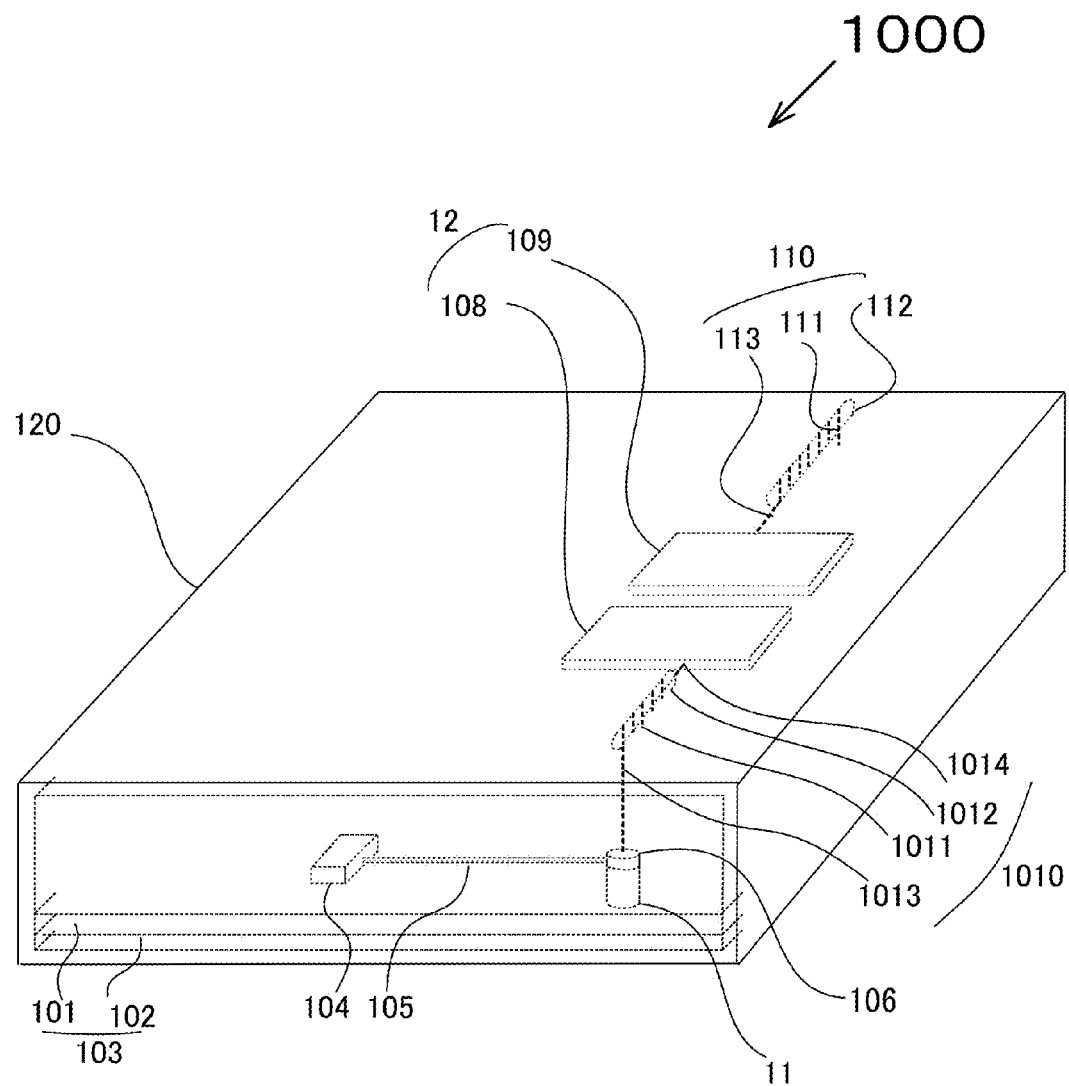
FIG. 13 is a view illustrating the configuration of a communication apparatus according to a third embodiment.
Figure 14:
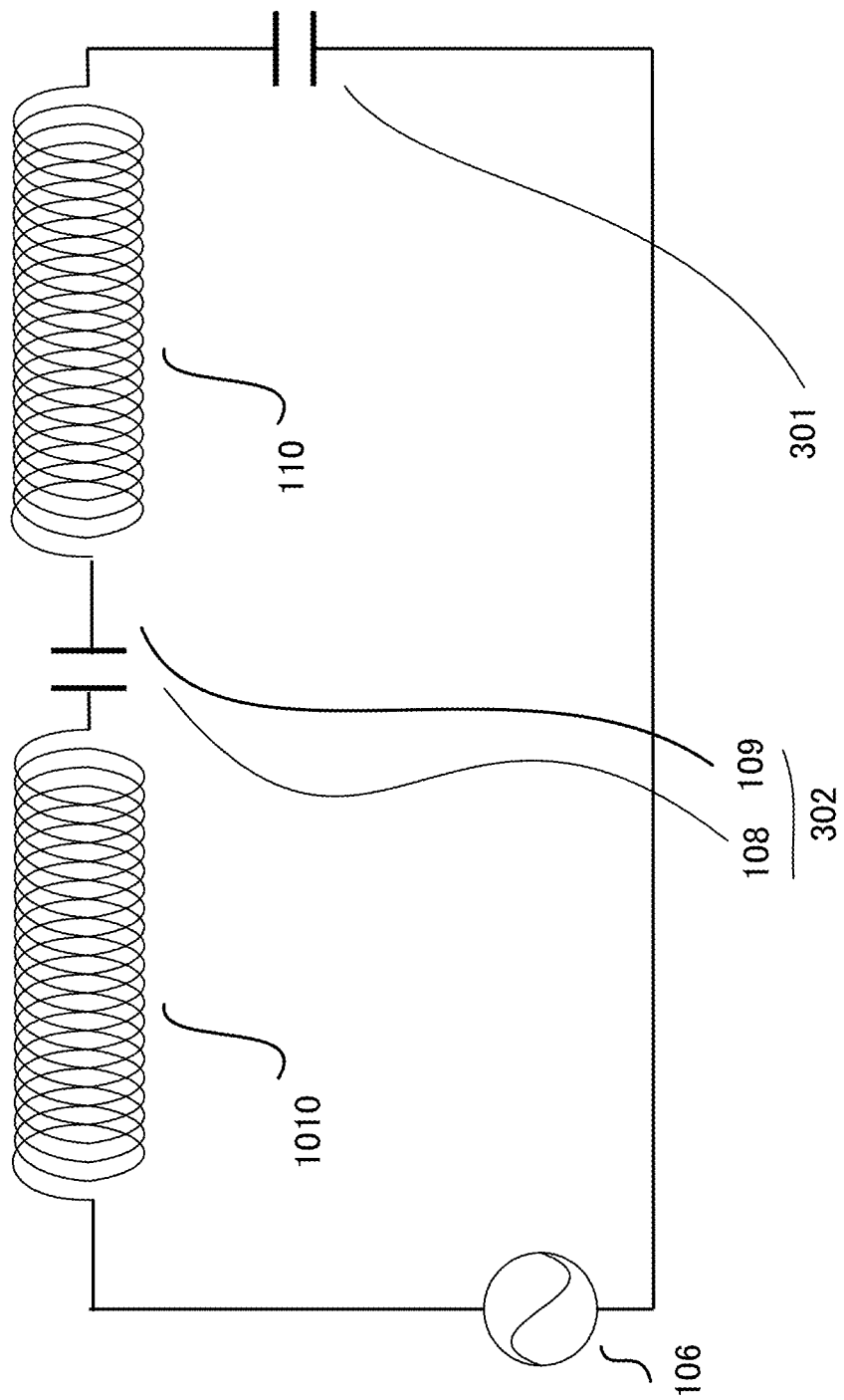
FIG. 14 is an equivalent circuit diagram of the communication apparatus according to the third embodiment.

A communication apparatus according to a third embodiment will be described with reference to the drawings. FIG. 13 is a diagram illustrating the configuration of the communication apparatus of the third embodiment. FIG. 14 is an equivalent circuit diagram of the communication apparatus. In the third embodiment, the capacitance of the signal electrode is reduced when communication is in execution by providing an inductor portion 1010 between the terminal 106 and the variable capacitance portion 12.

Hereinafter, the same constituent portions as those of the first embodiment are given the same reference numerals and are not described, and only different portions will be described.

As illustrated in FIG. 13, a communication apparatus 1000 includes the via 11, the variable capacitance portion 12, the substrate 103, the communication unit 104, the signal line 105, the terminal 106, the inductor portion 110, the housing 120, and the inductor portion 1010.

The communication apparatus 1000 executes communication when the human body 20 is close to or in contact with the conductors 108, 109 of the variable capacitance portion 12. The communication apparatus 1000 is applicable to medical/health care, near field communication, in-vehicle wireless communication, entertainment, and the like.

The inductor portion 1010 is provided between the terminal 106 and the variable capacitance portion 12 on the first principal surface's side of the dielectric portion 101 of the substrate 103. The inductor portion 1010 includes a winding wire 1011, a core 1012, a signal line 1013, and a signal line 1014. The inductor portion 1010 functions as the signal electrode.

One end of the signal line 1013 is connected to the terminal 106. The winding wire 1011 is a conductor wound around the core 1012 in a spiral. One end of the winding wire 1011 is connected to the other end of the signal line 1013. One end of the signal line 1014 is connected to the other end of the winding wire 1011, and the other end of the signal line 1014 is connected to the conductor 108 of the variable capacitance portion 12.

As illustrated in FIG. 14, in the equivalent circuit of the communication apparatus 1000, the inductor portion 1010, capacitor 302, the inductor portion 110, and the stray capacitance 301 are series-connected. The inductor portion 1010, the capacitor 302, and the inductor portion 110 constitute an LC series circuit. Accordingly, the capacitance of the signal electrode can be reduced when communication is in execution, thus increasing the efficiency.

Figure 15:
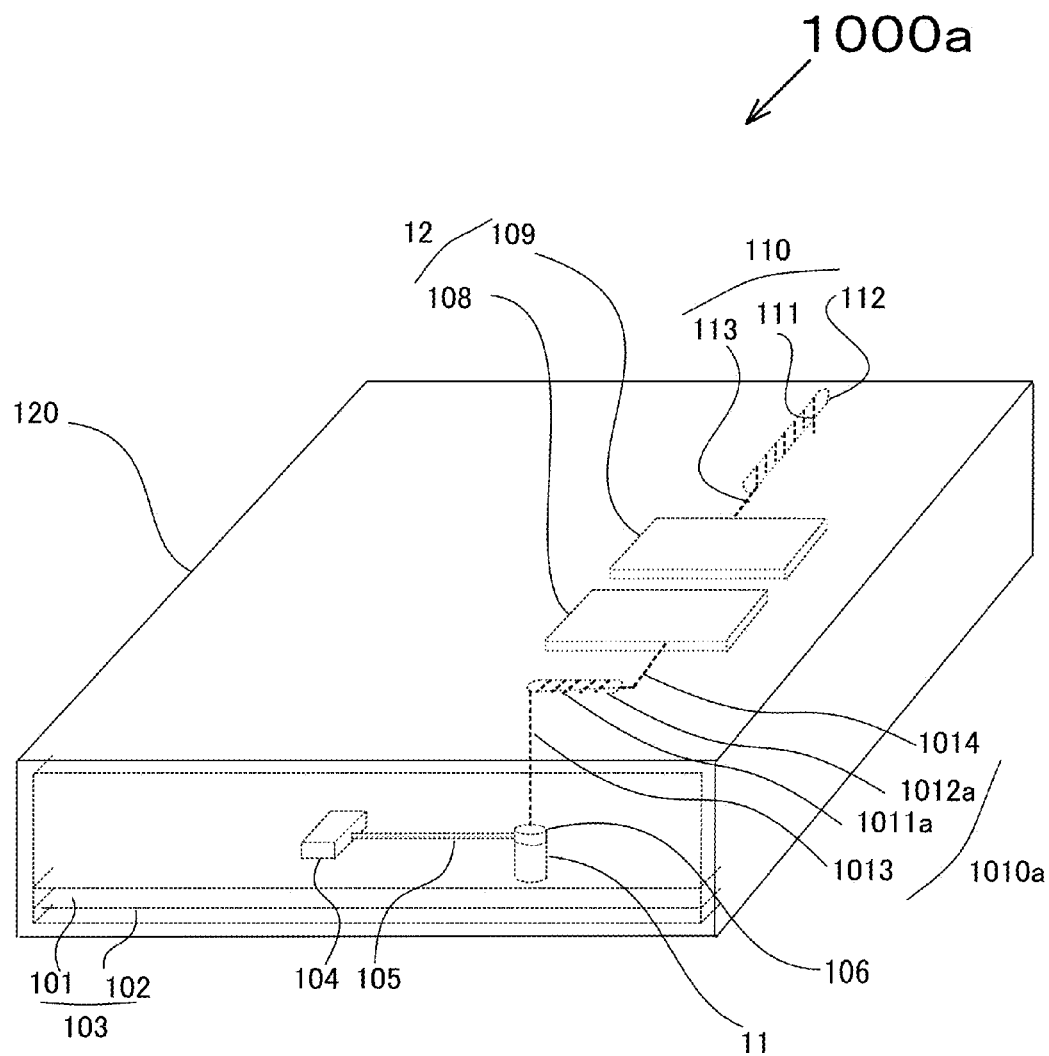
FIG. 15 is a view illustrating the configuration of a communication apparatus of a second modification.

The position of the inductor portion 1010 illustrated in FIG. 14 may be changed like a communication apparatus 1000a of a second modification illustrated in FIG. 15. To be specific, in a same plane, a winding wire 1011a and a core 1012a constituting an inductor portion 1010a are arranged so as to extend perpendicular to the direction that the winding wire 111 and the core 112 of the inductor portion 110 extend. The aforementioned arrangement of the winding wire 1011a and core 1012a can provide a desired inductance value with small space even when a predetermined mounting area is required.

Figure 16:
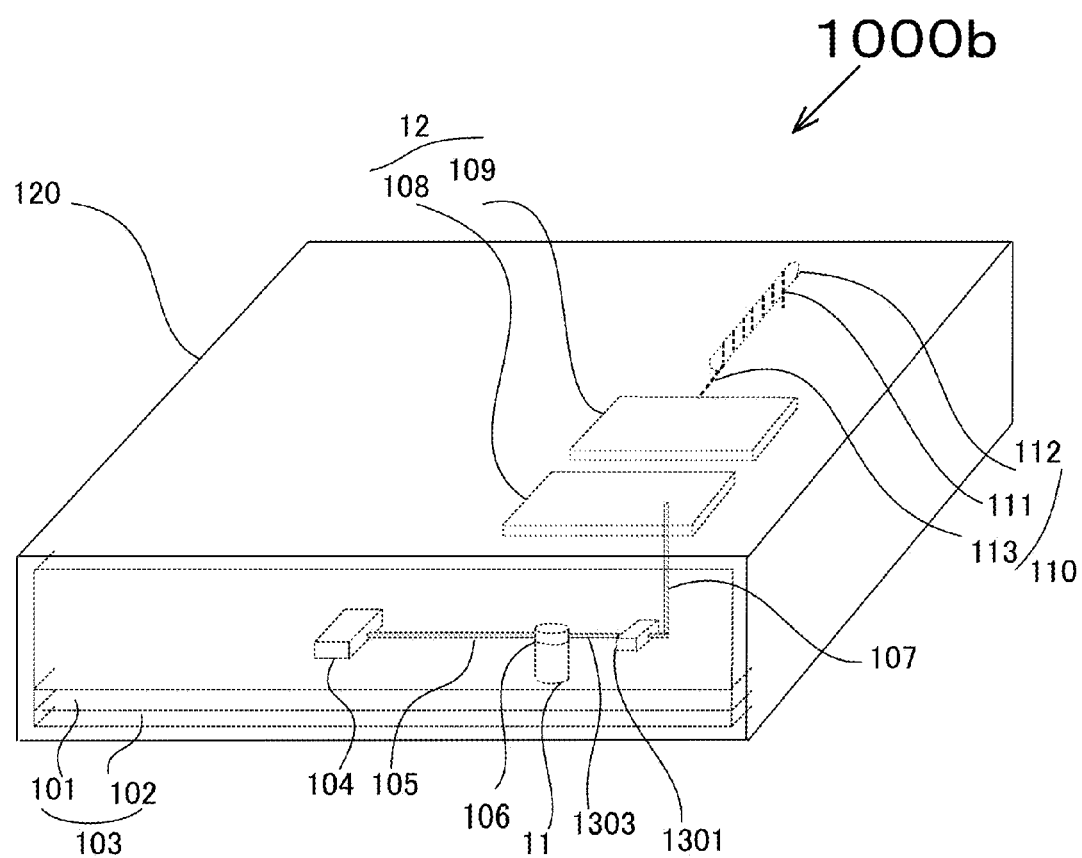
FIG. 16 is a view illustrating the configuration of a communication apparatus of a third modification.

Alternatively, a chip inductor 1301 may be provided between the terminal 106 and the variable capacitance portion 12 like a communication apparatus 1000b of a third modification illustrated in FIG. 16. To be specific, one end of a signal line 1303 is connected to the terminal 106. The chip inductor 1301 is provided on the first principal surface (the front surface) of the dielectric portion 101 of the substrate 103, and one end of the chip inductor 1301 is connected to the other end of the signal line 1303. One end of the signal line 107 is connected to the other end of the chip inductor 1301, and the other end of the signal line 107 is connected to the conductor 108 of the variable capacitance portion 12. The area occupied by the chip inductor 1301 is smaller than that occupied by the inductor portion 1010. Accordingly, providing the chip inductor 1301 can make the mounting area smaller than that required in the case of providing the inductor portion 1010.

As described above, the communication apparatus of the third embodiment includes the via 11, the variable capacitance portion 12, the substrate 103, the communication unit 104, the signal line 105, the terminal 106, the inductor portion 110, the housing 120, and the inductor portion 1010. The inductor portion 1010 is provided between the terminal 106 and the variable capacitance portion 12.

Accordingly, when being close to or in contact with the human body 20, the communication apparatus of the third embodiment can execute efficient communication in a similar manner to the first embodiment. Moreover, as the inductor portion 1010 is provided, it is possible to obtain a desired inductance value without increasing the mounting area.

Figure 17:
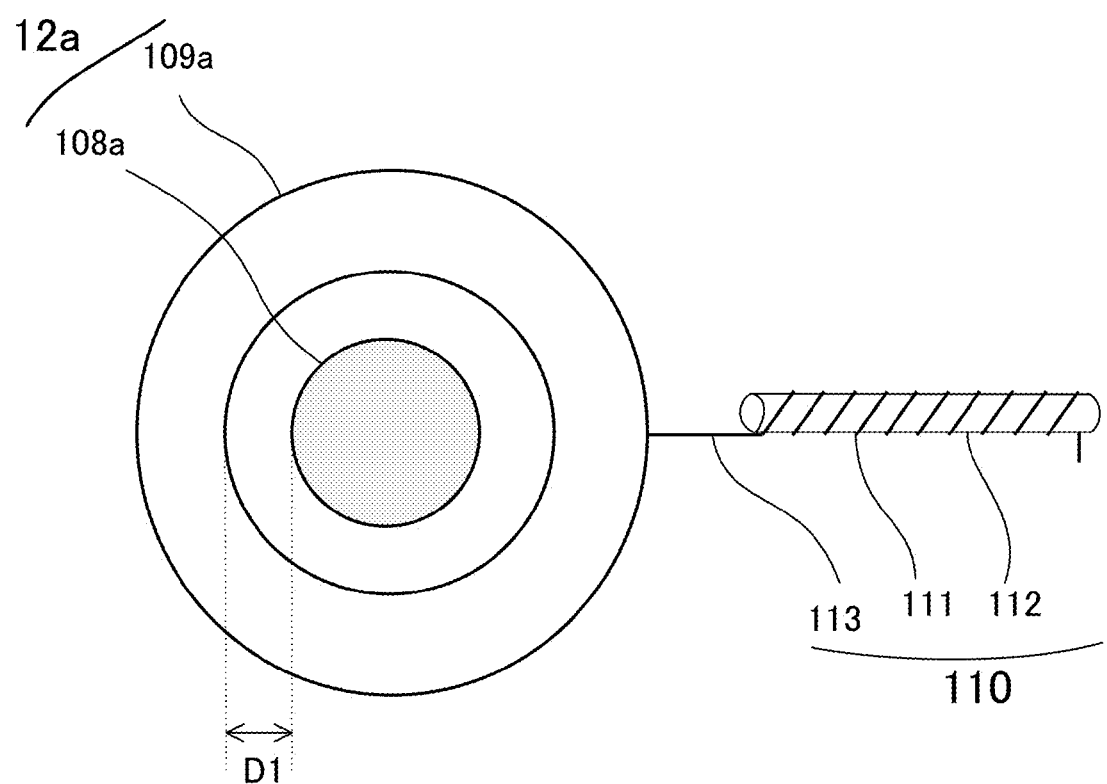
FIG. 17 is a view illustrating a variable capacitance portion and an inductor portion of a communication apparatus according to a fourth embodiment.

A communication apparatus according to a fourth embodiment will be described with reference to the drawings. FIG. 17 is a view illustrating a variable capacitance portion and inductor portion of the communication apparatus. In the fourth embodiment, the structure of the variable capacitance portion is changed.

Hereinafter, the same constituent portions as those of the first embodiment are given the same reference numerals and are not described, and only different portions will be described.

As illustrated in FIG. 17, a variable capacitance portion 12a has a growth ring structure including conductors 108a, 109a. The conductor 108a is circular and is located inside. The conductor 109a is ring-shaped and is located a distance D1 outside of the conductor 108a. The outer edge of the conductor 109a is connected to the one end of the signal line 113 of the inductor portion 110.

When the variable capacitance portion 12a has a growth ring structure, the conductors 108a, 109a can simultaneously come into contact with or close to the human body 20 irrespectively of the direction of contact. Accordingly, the capacitance of the capacitor 302, which is composed of the conductors 108a, 109a, can be always kept constant.

Figure 18A:
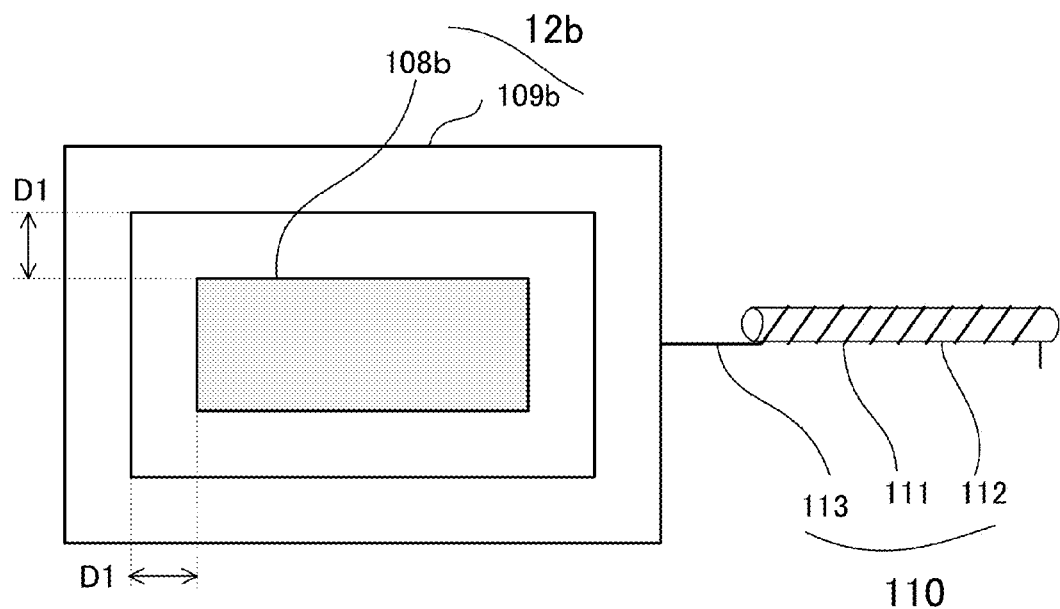
FIGS. 18A and 18B are views illustrating variable capacitance portions of a fourth modification, FIG. 18A being a view in which the first conductor is square, FIG. 18B being a view in which the first conductor is elliptical.
Figure 18B:
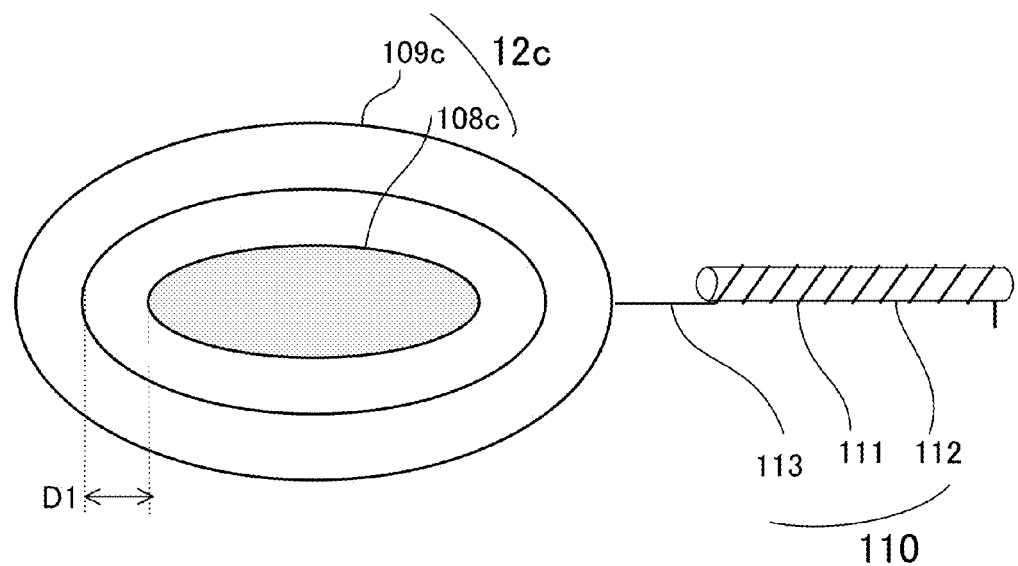

The growth ring structure can be changed like a fourth modification illustrated in FIGS. 18A, 18B. To be specific, in the case of FIG. 18A, a conductor 108b of the variable capacitance portion 12b is rectangular and is located inside. A conductor 109b of the variable capacitance portion 12b has a frame shape and is located a distance D1 outside of the conductor 108b.

In the case of FIG. 18B, a conductor 108c of the variable capacitance portion 12c is elliptical and is located inside. A conductor 109c of the variable capacitance portion 12c is toroidal and is located a distance D1 outside of the conductor 108c.

As described above, in the communication apparatus of the fourth embodiment, the variable capacitance portion 12a has a growth ring structure which is composed of the circular conductor 108a and the toroidal conductor 109a, which is located the distance D1 outside of the conductor 108a.

Accordingly, the capacitance value of the capacitor 302 can be always kept constant irrespectively of the direction of contact of the human body 20.

Figure 19:
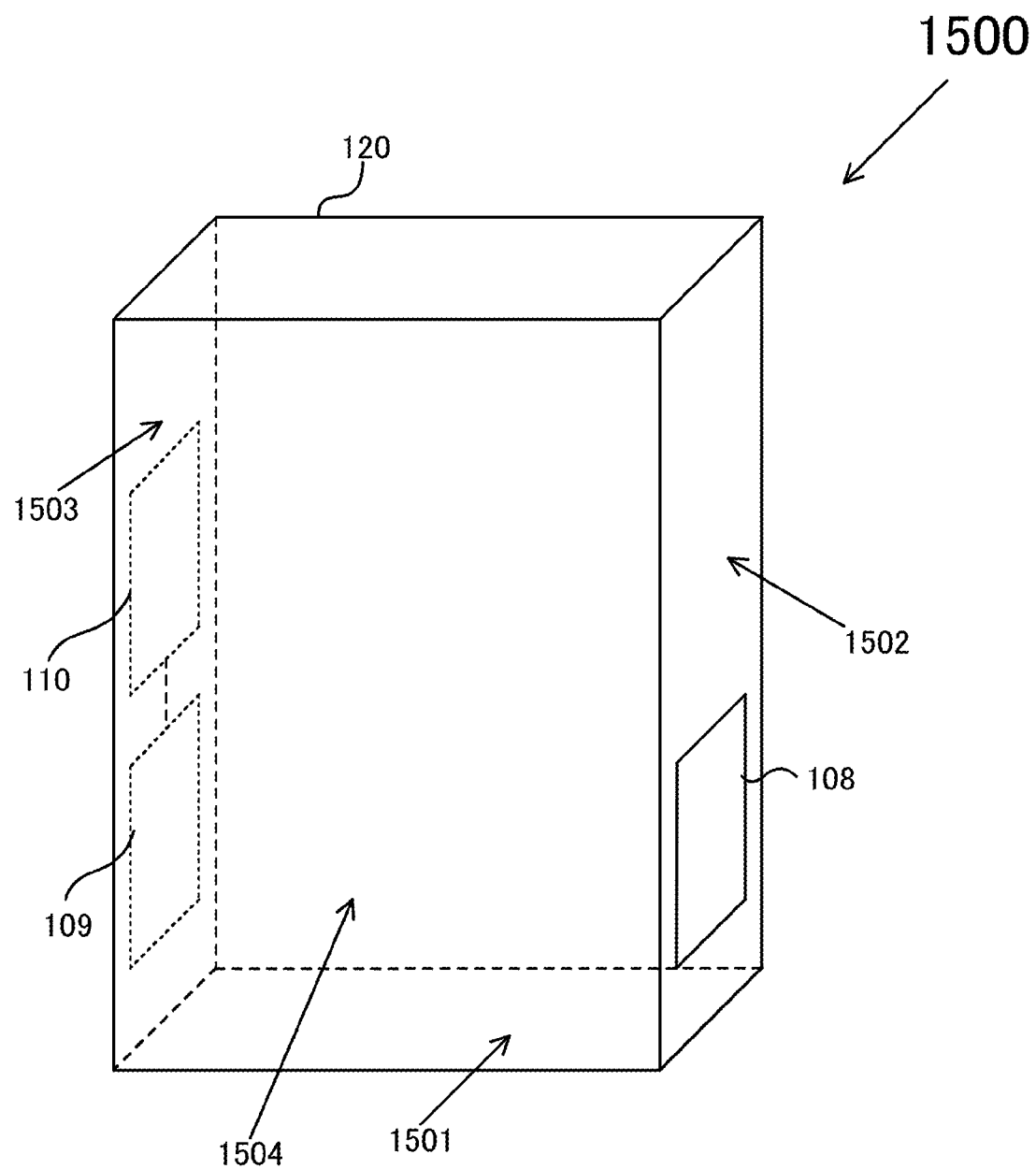
FIG. 19 is a view illustrating the arrangement of the variable capacitance portion and inductor portion of a communication apparatus according to a fifth embodiment.

A communication apparatus according to a fifth embodiment will be described with reference to the drawings. FIG. 19 is a view illustrating the arrangement of a variable capacitance portion and an inductor portion of the communication apparatus of the fifth embodiment. In the fifth embodiment, the second conductor constituting the variable capacitance portion is provided on a side surface different from the side surface where the first conductor is provided.

As illustrated in FIG. 19, a housing 120 of the communication apparatus 1500 has a box shape. Although not illustrated in FIG. 19, the housing 120 accommodates inside the substrate 103, the communication unit 104, the signal line 105, the terminal 106, the signal line 107, and the inductor portion 110 so that the above components are not exposed to the outside. The conductor 108 of the variable capacitance portion 12 is provided on a side surface 1502 (on the outer surface of the right sidewall) of the housing 120. The conductor 109 of the variable capacitance portion 12 is provided on a side surface 1503 (on the outer surface of the left sidewall) of the housing 120. The inductor portion 110 is provided under the side surface 1503 (on the inner surface of the left sidewall) of the housing 120.

As the conductors 108, 109 are arranged as described above, the conductors 108, 109 can simultaneously come into contact with the human body 20 which grips and holds the housing 120 by one hand, and the communication apparatus can therefore execute stable communication.

Figure 20:
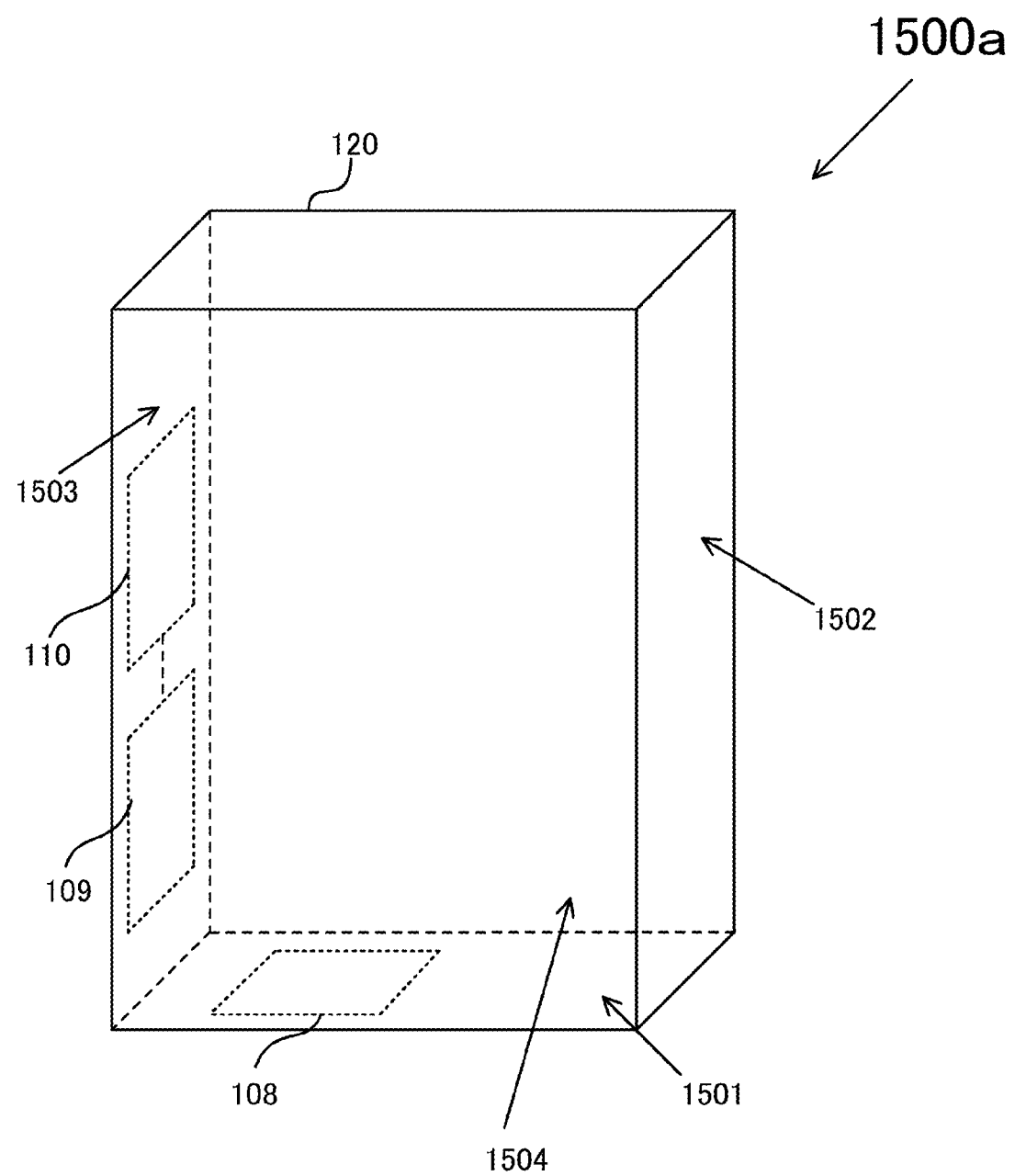
FIG. 20 is a view illustrating the arrangement of the variable capacitance portion and inductor portion of a communication apparatus according to a fifth modification.

The conductors 108, 109 may be arranged like a fifth modification illustrated in FIG. 20. To be specific, the conductor 108 of the variable capacitance portion 12 is provided on a side surface 1501 (the outer surface of the bottom wall) of the housing 120. The conductor 109 of the variable capacitance portion 12 is provided on the side surface 1503 (the outer surface of the left sidewall) of the housing 120.

Figure 21:
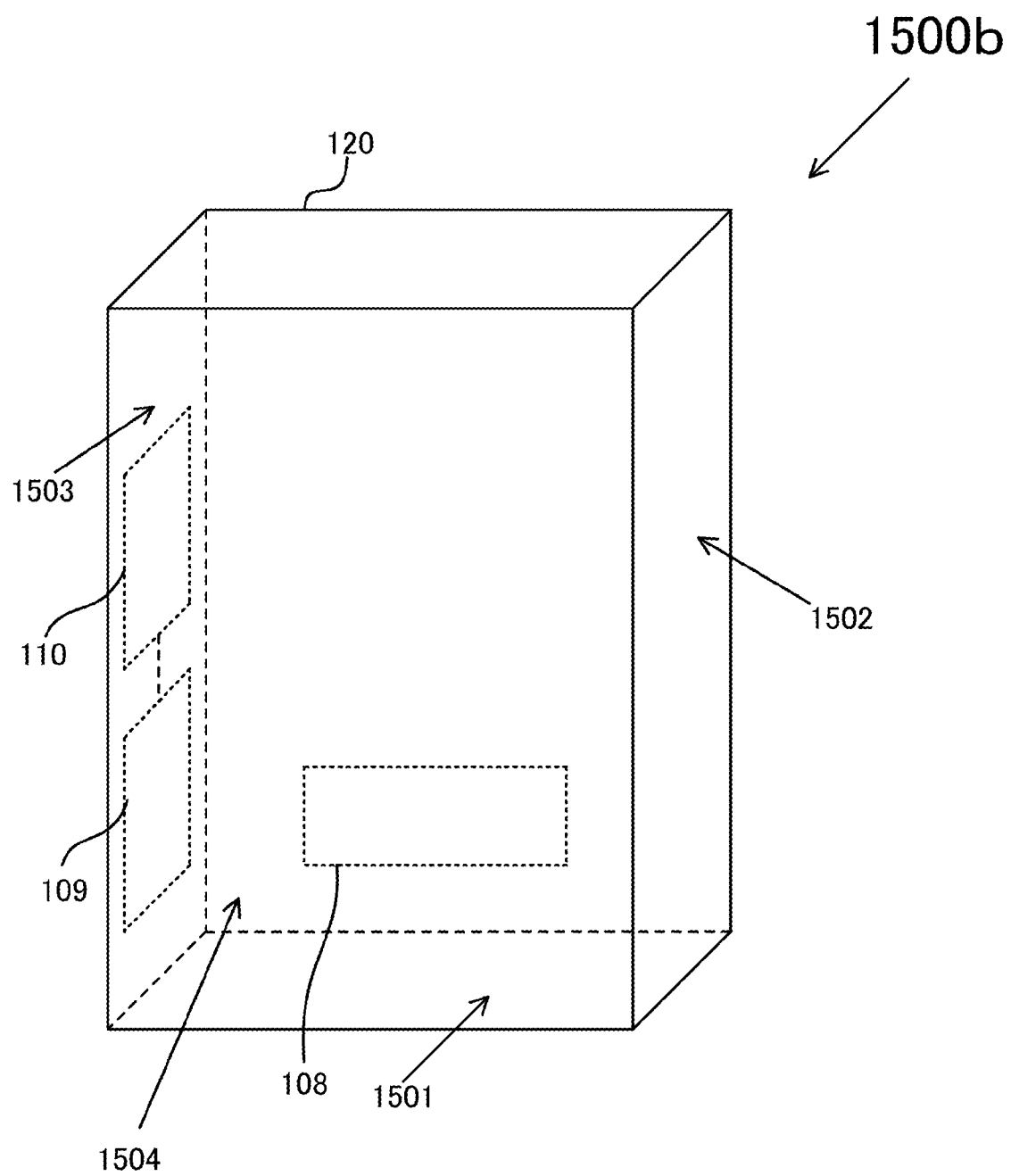
FIG. 21 is a view illustrating the arrangement of the variable capacitance portion and inductor portion of a communication apparatus according to a sixth modification.

Alternatively, the conductors 108, 109 may be located like a sixth modification illustrated in FIG. 21. To be specific, the conductor 108 of the variable capacitance portion 12 is provided on a side surface 1504 (the outer surface of the rear wall) of the housing 120. The conductor 109 of the variable capacitance portion 12 is provided on the side surface 1503 (the outer surface of the left sidewall) of the housing 120.

When the conductors 108, 109 are arranged like the fifth and sixth modifications, it is possible to reduce the influence of individual differences in how the human body 20 holds the communication apparatus.

Figure 22:
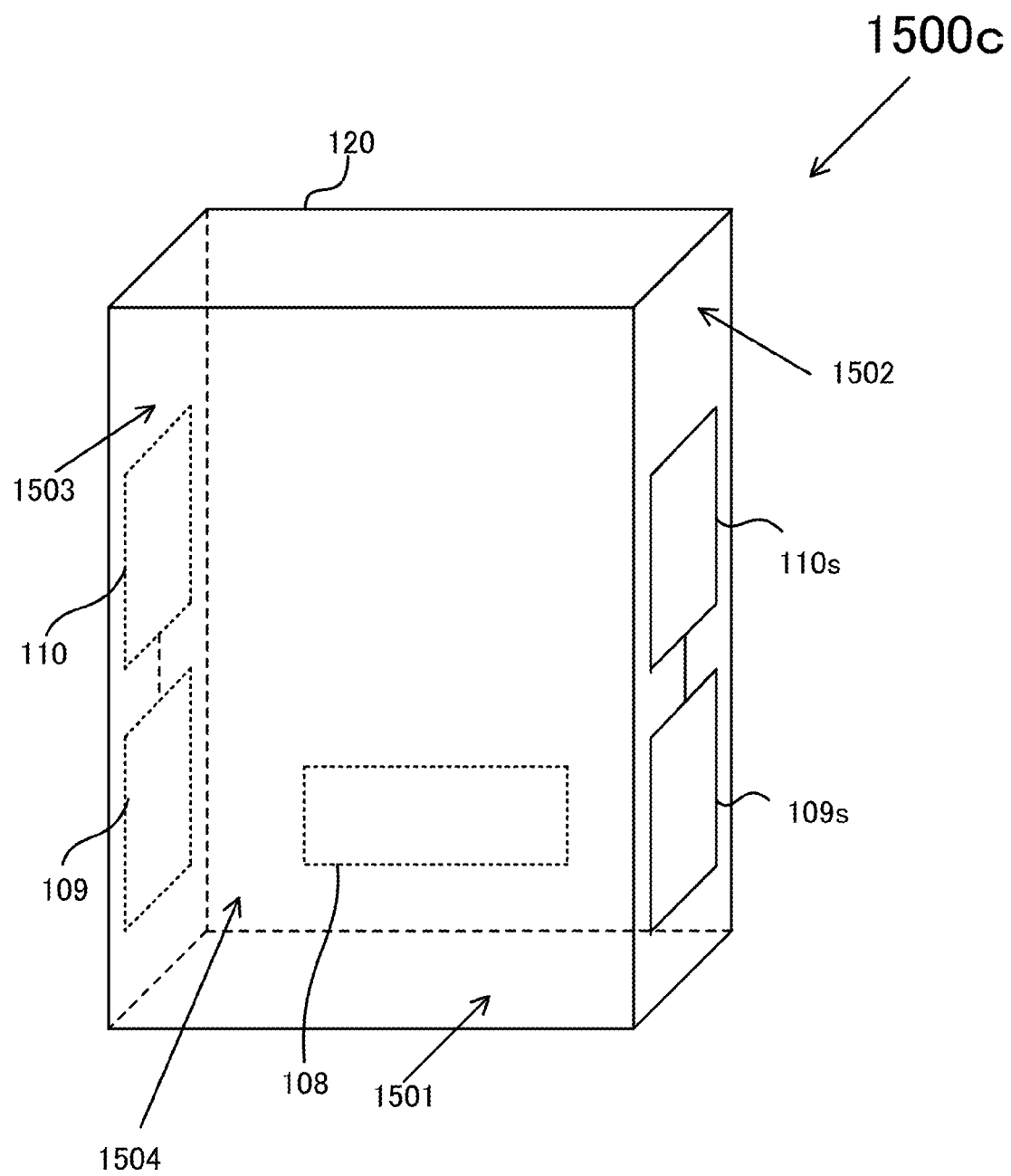
FIG. 22 is a view illustrating positions of the variable capacitance portion and inductor portion of a communication apparatus according to a seventh modification.

The conductors 108, 109, a conductor 109s, and an inductor portion 110s may be arranged like a seventh modification illustrated in FIG. 22. To be specific, the variable capacitance portion includes the conductors 108, 109, and 109s. The conductor 108 is provided on the side surface 1504 (the outer surface of the rear wall) of the housing 120. The conductor 109 is provided on the side surface 1503 (the outer surface of the left sidewall) of the housing 120. The conductor 109s is provided on the side surface 1502 (the outer surface of the right sidewall) of the housing 120. The inductor portion 110s is provided under the sidewall 1502 (the inner surface of the right sidewall) of the housing 120 and is connected to the conductor 109s.

When the conductors 108, 109, and 109s are arranged like the seventh modification, it is possible to reduce the influence of individual differences in how the human body 20 holds the communication apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus, comprising:
   a substrate provided with a reference potential electrode;
   a first communication unit provided on a first principal surface of the substrate and configured to transmit and receive;
   a first signal line provided on the first principal surface of the substrate and having one end connected to the first communication unit;
   a first terminal provided on the first principal surface of the substrate and connected to the other end of the first signal line;
   a second signal line having one end connected to the first terminal, the second signal line being connected to the first signal line through the first terminal;
   a variable capacitance portion having one end connected to the other end of the second signal line; and
   an inductor portion having one end connected to the other end of the variable capacitance portion, wherein
   the communication apparatus executes communication through a living body.

2. The communication apparatus according to claim 1, wherein
   the variable capacitance portion includes first and second conductors,
   each of the first and second conductors has a plate shape,
   the first conductor is connected to the other end of the second signal line, and
   the second conductor is provided at a predetermined distance apart from the first conductor and is connected to the inductor portion.

3. The communication apparatus according to claim 2, wherein communication is executed when the first and second conductors are close to or in contact with the living body.

4. The communication apparatus according to claim 2, further comprising a box-shaped housing covering and accommodating inside the substrate, the first communication unit, the first signal line, the first terminal, the second signal line, the variable capacitance portion, and the inductor portion.

5. The communication apparatus according to claim 2, further comprising a box-shaped housing covering and accommodating inside the substrate, the first communication unit, the first signal line, the first terminal, the second signal line, and the inductor portion.

6. The communication apparatus according to claim 5, wherein
   the first conductor is provided on an outer surface of a first sidewall of the housing, the second conductor is provided on an outer surface of a second sidewall of the housing that is opposite to the first sidewall, and the inductor portion is provided on an inner surface of the second sidewall of the housing.

7. The communication apparatus according to claim 5, wherein
   the first conductor is provided on an outer surface of a first sidewall of the housing, the second conductor is provided on an outer surface of a second sidewall of the housing that is adjacent to the first sidewall, and the inductor portion is provided on an inner surface of the second sidewall of the housing.

8. The communication apparatus according to claim 1, further comprising a chip inductor between the first terminal and the one end of the second signal line.

9. The communication apparatus according to claim 1, wherein
   the variable capacitance portion includes first and second conductors,
   the first conductor is connected to the other end of the second signal line,
   the second conductor is connected to the inductor portion, and
   the first and second conductors constitute a growth ring structure with the first conductor located inside and the second conductor located a predetermined distance outside of the first conductor.

10. The communication apparatus according to claim 9, wherein the first conductor has a circular shape, and the second conductor has a ring shape.

11. The communication apparatus according to claim 9, wherein the first conductor has a rectangular shape, and the second conductor has a frame shape.

12. The communication apparatus according to claim 9, wherein the first conductor has an elliptical shape, and the second conductor has a toroidal shape.

13. The communication apparatus according to claim 1, wherein the substrate is a multi-layer substrate including a dielectric on the reference potential electrode.

14. The communication apparatus according to claim 1, wherein each of the first and second conductors is composed of any one of an electrode, a conductive sheet, a conductive ink, and a transparent conducting material.

15. The communication apparatus according to claim 1, wherein
the inductor portion includes a third signal line, a core, and a winding wire,
one end of the third signal line is connected to the other end of the variable capacitance portion,
the core is composed of a magnetic body, and
the winding wire is a conductor wound around the core, and one end of the winding wire is connected to the other end of the third signal line.

16. The communication apparatus according to claim 1, further comprising: a fourth signal line, a second terminal, a fifth signal line, and a capacitor, wherein
one end of the fourth signal line is connected to the other end of the inductor portion,
the second terminal is provided on the first principal surface of the substrate,
the second terminal is connected to the other end of the fourth signal line,
the fifth signal line is provided on the first principal surface of the substrate,
one end of the fifth signal line is connected to the second terminal,
the fifth signal line is connected to the fourth signal line through the second terminal,
the capacitor is provided on the first principal surface of the substrate,
one end of the capacitor is connected to the other end of the fifth signal line while the other end of the capacitor is electrically connected to the reference potential electrode.

* * * * *